United States Patent
Aquil et al.

(10) Patent No.: US 12,468,332 B2
(45) Date of Patent: Nov. 11, 2025

(54) ENHANCED CHIP SELECT SIGNAL TRAINING

(71) Applicant: QUALCOMM Incorporated, San Diego, CA (US)

(72) Inventors: Farrukh Aquil, San Diego, CA (US); Boris Dimitrov Andreev, San Diego, CA (US); Joon Young Park, San Diego, CA (US); Yong Xu, San Diego, CA (US); Vishal Mishra, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 141 days.

(21) Appl. No.: 18/499,048

(22) Filed: Oct. 31, 2023

(65) Prior Publication Data

US 2025/0138571 A1 May 1, 2025

(51) Int. Cl.
*G11C 7/10* (2006.01)
*G06F 1/08* (2006.01)

(52) U.S. Cl.
CPC .............. *G06F 1/08* (2013.01); *G11C 7/1048* (2013.01)

(58) Field of Classification Search
CPC . G11C 7/1048; G11C 29/02; G11C 29/50012; G11C 29/028; G06F 1/08
See application file for complete search history.

(56) References Cited

U.S. PATENT DOCUMENTS

| | | | | |
|---|---|---|---|---|
| 12,009,023 B2* | 6/2024 | Wu | ...................... | G11C 29/021 |
| 12,235,783 B2* | 2/2025 | Verna-Ketel | ........ | G06F 13/4027 |
| 2011/0116332 A1* | 5/2011 | Naka | ................. | G11C 29/12005 |
| | | | | 365/201 |
| 2014/0189224 A1* | 7/2014 | Kostinsky | ............ | G11C 29/028 |
| | | | | 711/105 |
| 2018/0121123 A1* | 5/2018 | Morris | .................. | G06F 3/0604 |
| 2018/0122486 A1 | 5/2018 | Choi et al. | | |

(Continued)

FOREIGN PATENT DOCUMENTS

WO 2024077800 A1 4/2024

OTHER PUBLICATIONS

Arar S., "Boosting Memory Performance in the Age of DDR5: An Intro to DDR Training Modes", News, Nov. 6, 2020, retrieved on Nov. 13, 2024, pp. 1-6.

(Continued)

*Primary Examiner* — Khamdan N. Alrobaie
(74) *Attorney, Agent, or Firm* — Harrity & Harrity, LLP

(57) ABSTRACT

In some aspects, an electronic device may receive a clock signal having a first frequency. The electronic device may receive, for a chip select training operation, a chip select signal having a pattern including high pulses and low pulses. The electronic device may perform, for a sampling window, the chip select training operation using the clock signal and the chip select signal, wherein the sampling window includes a quantity of pulses of the chip select signal. The electronic device may provide, via a first data in or out (DQ) pin, an indication of a first result of the chip select training operation for the high pulses of the chip select signal. The electronic device may provide, via a second DQ pin, an indication of a second result of the chip select training operation for the low pulses of the chip select signal. Numerous other aspects are described.

30 Claims, 8 Drawing Sheets

(56) References Cited

U.S. PATENT DOCUMENTS

2018/0204610 A1*  7/2018  Hsieh .................... G11C 11/408
2022/0148639 A1   5/2022  Wu et al.
2022/0300197 A1   9/2022  Sethuraman et al.
2023/0108373 A1   4/2023  Chen

OTHER PUBLICATIONS

International Search Report and Written Opinion—PCT/US2024/046863—ISA/EPO—Dec. 19, 2024.

* cited by examiner

ENHANCED CHIP SELECT SIGNAL TRAINING

FIELD OF THE DISCLOSURE

Aspects of the present disclosure generally relate to integrated circuits, memory devices, and, for example, to enhanced chip select signal training.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

In some examples, memory devices may receive commands from memory controllers (or other devices) over command buses, which may be trained to ensure that the signaling between the devices meets expected standards. "Training" can refer to iterative testing of different I/O (input/output) interface parameters to determine settings that result in best accuracy of signaling on the signal lines. With decreasing device geometries, smaller package sizes, increasing channel bandwidth, and increasing signaling frequencies, differences in design can result in variations in how signals are sent and received between a memory controller and memory device. The significant variation in memory channel layouts may reduce the likelihood that memory devices will operate reliably, accurately, and/or efficiently in a default state without training the command signaling.

One example of command signal training is chip select (CS) signal training. A CS signal (sometimes referred to as a chip enable (CE) signal) may be a signal used to indicate which device (e.g., which integrated circuit or memory device, sometimes referred to as "chips") should execute a command on a command bus when there are multiple devices connected to the same command bus. For example, the CS signal may enable a memory controller to select a given memory device to execute a command within a system that contains multiple memory devices connected to the same command bus or interface. CS signal training may enable the CS signal to be aligned with an internal clock signal of a memory system, as described in more detail elsewhere herein.

SUMMARY

In some implementations, an electronic device includes one or more controllers configured to: receive a clock signal having a first frequency; receive, for a chip select training operation, a chip select signal having a pattern including high pulses and low pulses; perform, for a sampling window, the chip select training operation using the clock signal and the chip select signal, wherein the sampling window includes a quantity of pulses of the chip select signal; provide, via a first data in or out (DQ) pin, an indication of a first result of the chip select training operation for the high pulses of the chip select signal; and provide, via a second DQ pin, an indication of a second result of the chip select training operation for the low pulses of the chip select signal.

In some implementations, a method performed by an electronic device includes receiving a clock signal having a first frequency; receiving, for a chip select training operation, a chip select signal having a pattern including high pulses and low pulses; performing, for a sampling window, the chip select training operation using the clock signal and the chip select signal, wherein the sampling window includes a quantity of pulses of the chip select signal; providing, via a first DQ pin, an indication of a first result of the chip select training operation for the high pulses of the chip select signal; and providing, via a second DQ pin, an indication of a second result of the chip select training operation for the low pulses of the chip select signal.

In some implementations, a system includes one or more controllers configured to: receive a clock signal having a first frequency; receive, for a chip select training operation, a chip select signal having a pattern including high pulses and low pulses; perform, for a sampling window, the chip select training operation using the clock signal and the chip select signal, wherein the sampling window includes a quantity of pulses of the chip select signal; provide, via a first DQ pin, an indication of a first result of the chip select training operation for the high pulses of the chip select signal; and provide, via a second DQ pin, an indication of a second result of the chip select training operation for the low pulses of the chip select signal.

In some implementations, an apparatus includes means for receiving a clock signal having a first frequency; means for receiving, for a chip select training operation, a chip select signal having a pattern including high pulses and low pulses; means for performing, for a sampling window, the chip select training operation using the clock signal and the chip select signal, wherein the sampling window includes a quantity of pulses of the chip select signal; means for providing, via a first DQ pin, an indication of a first result of the chip select training operation for the high pulses of the chip select signal; and means for providing, via a second DQ pin, an indication of a second result of the chip select training operation for the low pulses of the chip select signal.

In some implementations, a non-transitory computer-readable medium storing a set of instructions includes one or more instructions that, when executed by one or more processors of an electronic device, cause the electronic device to: receive a clock signal having a first frequency; receive, for a chip select training operation, a chip select signal having a pattern including high pulses and low pulses; perform, for a sampling window, the chip select training operation using the clock signal and the chip select signal, wherein the sampling window includes a quantity of pulses of the chip select signal; provide, via a first DQ pin, an indication of a first result of the chip select training operation for the high pulses of the chip select signal; and provide, via a second DQ pin, an indication of a second result of the chip select training operation for the low pulses of the chip select signal.

Aspects generally include a method, apparatus, system, computer program product, non-transitory computer-readable medium, user device, user equipment, electronic device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
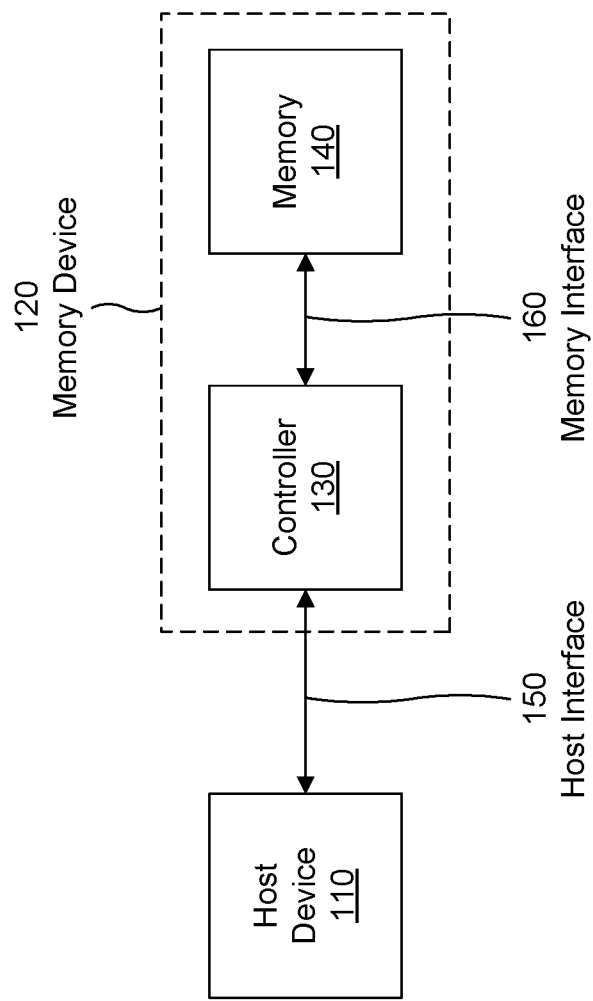
FIG. 1 is a diagram illustrating an example electronic device that may support enhanced chip select signal training, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Double data rate (DDR) is a type of memory used by memory devices that is associated with improved performance for random access memory (RAM). For example, DDR memory (e.g., DDR dynamic RAM (DRAM) may be associated with data transfer on both the rising edge and falling edge of a clock signal. This allows for faster data transfer rates, increased bandwidth, and/or improved power efficiency, among other examples, as compared to systems where data is only transferred once each clock cycle (e.g., on only the rising edge or the falling edge of the clock signal). For example, DDR may enable faster data transfer rates between memory and a memory controller or host device, thereby improved the overall performance of a system that includes a memory device or memory system utilizing DDR. There are multiple versions (or generations) of DDR, such as DDR (DDR1), DDR2, DDR3, DDR4, DDR5, DDR6, and/or future versions of DDR (e.g., DDR7 and so on). The different versions of DDR may be associated with different capacities, different clock frequencies, and/or different data transfer rates (e.g., speeds), among other examples. Low-power DDR (LPDDR) may be a type of memory consuming relatively low power. An LPDDR memory device may be associated with a maximum density (bits), a memory array clock, a prefetch size, memory densities, an input/output (I/O) bus clock frequency, a data transfer rate, a supply voltage, and/or a command/address bus.

As described herein, a chip select (CS) training operation (sometimes referred to as a chip select training mode (CSTM)) may enable a memory device to train a CS signal separately from other command bus training. The memory device and a memory controller can communicate via a command bus that includes a CS signal line. Instead of training the CS signal along with other signal lines of the command bus, the CS training operation enables the memory device to train the CS signal more accurately. For example, the memory device can be triggered to perform a CS training operation via a command, and then train voltage margining for the CS signal line to align CS signaling with a clock signal. For example, a memory controller may transmit a CS signal having a pattern of high pulses and low pulses (e.g., logic high and logic low pulses). The pattern may be a defined pulse pattern, such as a "01010101" clock-like pattern where "0" represents a low pulse of the CS signal and "1" represents a high pulse of the CS signal. For example, a CS signal may be associated with two (or more) states, such as a high state (referred to herein as a high pulse) or a low state (referred to herein as a low pulse). For a high pulse, the CS signal may transition to a high voltage and stay at the high voltage for a duration (e.g., an amount of time). For a low pulse, the CS signal may transition to a low voltage and stay at the low voltage for a duration (e.g., an amount of time). An indication that a memory device (e.g., a chip) is selected or asserted for a given command may be mapped to a first CS signal state and an indication that a memory device (e.g., a chip) is not selected for a given command may be mapped to a second CS signal state. DDR5 may be associated with an active low CS signal (e.g., where the low pulse indicates that a memory device is selected and a high pulse indicates that the memory device is not selected). LPDDR6 may be associated with an active high CS signal (e.g., where the high pulse indicates that a memory device is selected and a low pulse indicates that the memory device is not selected).

In a given CS training operation, a memory device may sample the CS signal at an edge of the clock signal (e.g., a rising edge or falling edge, because the CS signal may be a single data rate (SDR) signal that is transmitted once for each clock cycle). The memory device may determine whether the CS signal has the expected pattern of high pulses and low pulses. If the memory device determines that the CS signal does have the expected pattern, then the memory device may indicate, to the memory controller, that the CS training operation has passed (e.g., via a data in or out (DQ) bus). If the memory device determines that the CS signal does not have the expected pattern, then the memory device may indicate, to the memory controller, that the CS training operation has failed. The memory controller may transmit CS signals having different delays (e.g., for respective CS training operations) to determine a timing of the CS signal that best aligns with the clock signal (e.g., at the memory device).

As described elsewhere herein, clock frequencies and/or speeds of DDR memory devices may increase in newer versions (or generations) of DDR. For example, in DDR5 (e.g., LPDDR5x (sometimes referred to as LP5x)), the memory device may support a maximum speed of 2.4 gigabits per second (Gbps), a clock frequency of 1.2 gigahertz (GHz), and a CS frequency of 0.6 GHz. In LPDDR6 or LP6, it is expected that the memory device may support a maximum speed of 6.4 Gbps, a clock frequency of 3.2 GHz, and a CS frequency of 1.6 GHz. The increased data rates and/or frequencies may introduce additional challenges and/or complexities for training command signaling. For example, robust training may be needed to reduce a likelihood of inter-symbol interference (ISI) (e.g., where signals representing different commands or data bits on a communication channel interfere with each other), cross-talk (e.g., an unintended interference or coupling of signals between different signal lines), and/or voltage noise (e.g., unintended or random fluctuations or variations in the voltage levels of the signals that carry command and control information), among other examples.

For example, a memory device may use long burst CA training, where a CA signal uses a continuous long burst signal for CA training (e.g., rather than a single CA data point or pattern). Because of the continuous long burst signal, a CS signal may be kept as a high pulse (indicating active) for the duration of the continuous long burst signal. This increases complexity for CS training because the CS signal cannot be swept (e.g., in pulses from high pulse to low pulse) for the CS training. Additionally, because of the increased speeds or frequencies, an amount of time in which a result of a CS training operation is available for the memory controller or host device to read may be reduced. For example, for a CS training operation, the result may be available (e.g., via a DQ bus) only for a duration of a sampling window of the CS training operation (e.g., N clock cycles, such as two clock cycles). With the increased frequency of the clock signal, the amount of time for which an output of a sampling window of the CS training operation is available on a pin of a DQ bus (e.g., before being overwritten with the result of a next sampling window) is decreased. Further, at a conclusion of a CS training operation, the CS signal may be set to a given value (e.g., high or low), resulting in the memory device determining a failure of the CS training operation and overwriting a result of a last sampling window of the CS training operation with a false result (e.g., a false failure result). This increases the likelihood that the memory controller or host device is unable to read the result of the CS training operation, thereby degrading the performance of the CS training operation. The degraded performance of the CS training operation may result in ISI, cross-talk, and/or voltage noise, among other examples, for signals communicated via a command bus for a memory device.

Additionally, current CS training operations merge results of the CS training operation for high pulses and low pulses of the CS signal via a single pin of a DQ bus. For example, if a failure of the CS training operation is detected, the pin of the DQ bus may be modified to indicate the failure. However, the host device or the memory controller may be unable to determine whether the failure was associated with a high pulse or a low pulse of the CS signal. As a result, the host device or the memory controller may be unable to identify whether a channel for high pulses or low pulses of the CS signal is causing a misalignment with the clock signal.

Various aspects relate generally to enhanced CS signal training (e.g., for DDR or LPDDR that uses increased data rates and/or increased frequencies). In some aspects, as described herein, an electronic device (e.g., a memory device) that employs CS signal training may use multiple DQ pins to provide separate outputs for a CS signal training operation. For example, the electronic device may sample a CS signal on edges (e.g., a rising edge or a falling edge) of a received clock signal. The electronic device may alternate sampling high pulse and low pulses on the clock cycle. For example, the electronic device may sample a first type of pulse (e.g., high pulses or low pulses) of the CS signal on even clock cycles and a second type of pulse (e.g., low pulses or high pulses) on odd clock cycles. The electronic device may provide a first output of the CS training operation for the even clock cycles via a first DQ pin and a second output of the CS training operation of the odd clock cycles via a second DQ pin.

For example, if the electronic device detects a failure for a given sample of the CS signal, then the electronic device may change a status of the corresponding DQ pin to indicate the failure. The indication of the failure may remain (e.g., persistently) on the corresponding DQ pin for a duration of the CS training operation and/or until a next CS training operation. Therefore, the electronic device may indicate CS training results for CS high pulses and CS low pulses via different DQ pins.

Additionally, or alternatively, the electronic device may perform a CS training operation for a defined sampling window. The sampling window may include a quantity of CS pulses (e.g., where a high pulse or a low pulse is one pulse of the CS signal). For example, the electronic device may sample the CS signal for a given quantity of CS signal pulses and end the CS training operation after the given quantity of CS signal pulses have been sampled. In some aspects, the electronic device may refrain from modifying an indicated output on the DQ pin(s) for the CS training operation after the given quantity of CS signal pulses have been sampled.

In some aspects, the electronic device may use a low frequency entry and/or a low frequency exit for the CS training operation. For example, the electronic device may reduce a frequency of a clock signal prior to and/or after performing the CS training operation. The electronic device may receive a command to enter (e.g., to initiate) the CS training operation (e.g., a command to enter a CSTM) using the reduced clock frequency. Additionally, or alternatively, the electronic device may receive a command to end the CS training operation (e.g., a command to exit the CSTM) using the reduced clock frequency.

Particular aspects of the subject matter described in this disclosure can be implemented to realize one or more of the following potential advantages. In some examples, by using separate DQ pins to indicate results for respective CS signal pulse types (e.g., high pulses or low pulses), the electronic device may identify whether channels for CS signal high pulses or CS signal low pulses are not aligned with the clock signal. This may enable the memory controller to quickly and accurately adjust the CS signal to be aligned with the clock signal. For example, this may enable a host device (e.g., a system on chip (SoC) component) to better determine a next CS toggle pattern for a next CS training operation (e.g., to better align the CS signal with the clock signal and/or to adjust one (or both) of the CS high pulse width or the CS low pulse width), resulting in more efficient CS training. In some aspects, by using separate DQ pins to indicate results for respective CS signal pulse types, the electronic device may be enabled to increase the amount of time for which a result is indicated via a given DQ pin. For example, because the results are indicated by CS pulse type (rather than for one or more particular samples), the electronic device may persistently indicate a failure of the CS training operation (e.g., rather than overwriting the failure indication with a result of a next one or more CS signal samples). This may improve the likelihood that a memory controller or host device is able to read the results from the DQ pins when using higher data transfer speeds and/or higher clock frequencies.

In some aspects, by performing the CS training operation using a defined sampling window (e.g., a defined quantity of CS signal pulses), the electronic device may identify when a CS training operation is intended to end (e.g., without receiving an explicit command to end the CS training operation). As a result, a likelihood that the electronic device outputs a false failure indication for the CS training operation is reduced. Further, the electronic device may conserve processing resources and/or power resources that would have otherwise been used to sample the CS signal after a pulse pattern for the CS training operation is completed.

In some aspects, by using a low-frequency entry and/or a low-frequency exit for the CS training operation, a likelihood that commands to enter or exit the CS training operation are received by the memory device may be improved. For example, some DDR versions (such as LPDDR6) may use multi-cycle commands (e.g., commands over multiple clock cycles), so that a multi-purpose command (MPC) for the commands to enter or exit the CS training operation (or another command bus training operation) cannot be extended (unlike other DDR versions, such as DDR5, that use single-cycle commands). Therefore, by reducing the clock frequency, a likelihood that the electronic device is able to read or capture the commands to enter or exit the CS training operation (or another command bus training operation) may be improved (e.g., because the multi-cycle commands may be present for a longer amount of time with the reduced clock frequency).

FIG. 1 is a diagram illustrating an example electronic device 100 that may support enhanced chip select signal training, in accordance with the present disclosure. The electronic device 100 may include one or more devices, apparatuses, and/or components for performing operations described herein. For example, the electronic device 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160. In some examples, the electronic device 100 may be referred to as a memory system and the memory device 120 may be referred to as a memory sub-system.

The electronic device 100 may be any suitable electronic device configured to store data in memory. For example, the electronic device 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), or the like.

The memory device 120 may be any electronic device configured to store data in memory. In some aspects, the memory device 120 may be an electronic device configured to store data temporarily in volatile memory. For example, the memory device 120 may be a random-access memory (RAM) device, such as a dynamic RAM (DRAM) device or a static RAM (SRAM) device. In this case, the memory 140 may include volatile memory that requires power to maintain stored data and that loses stored data after the memory device 120 is powered off. For example, the memory 140 may include one or more latches and/or RAM, such as DRAM and/or SRAM. In some aspects, the memory 140 may include non-volatile memory configured to maintain stored data after the memory device 120 is powered off, such as NAND memory or NOR memory. For example, the non-volatile memory may store persistent firmware or other instructions for execution by the controller 130.

The controller 130 may be any device configured to communicate with the host device 110 (e.g., via the host interface 150) and the memory 140 (e.g., via the memory interface 160). Additionally, or alternatively, the controller 130 may be configured to control operations of the memory device 120 and/or the memory 140. For example, the controller 130 may include control logic, a memory controller, a system controller, an ASIC, an FPGA, a processor, a microcontroller, and/or one or more processing components. In some aspects, the controller 130 may be a high-level controller, which may communicate directly with the host device 110 and may instruct one or more low-level controllers regarding memory operations to be performed in connection with the memory 140. In some examples, the controller 130 may be a low-level controller, which may receive instructions regarding memory operations from a high-level controller that interfaces directly with the host device 110. As an example, a high-level controller may be a solid state drive (SSD) controller, and a low-level controller may be a non-volatile memory controller (e.g., a NAND controller) or a volatile memory controller (e.g., a DRAM controller). In some aspects, a set of operations described herein as being performed by the controller 130 may be performed by a single controller (e.g., the entire set of operations may be performed by a single high-level or low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, a Non-Volatile Memory Express (NVMe) interface, a universal serial bus (USB) interface, a Universal Flash Storage (UFS) interface, and/or an embedded multimedia card (eMMC) interface.

The memory interface 160 enables communication between the controller 130 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a DDR interface.

In some aspects, as described in more detail elsewhere herein, one or more systems, devices, apparatuses, components, and/or controllers of FIG. 1 may be configured to receive a clock signal having a first frequency; receive, for a chip select training operation, a chip select signal having a pattern including high pulses and low pulses; perform, for a sampling window, the chip select training operation using the clock signal and the chip select signal (e.g., where the sampling window includes a quantity of pulses of the chip select signal); provide, via a first DQ pin, an indication of a first result of the chip select training operation for the high pulses of the chip select signal; and/or provide, via a second DQ pin, an indication of a second result of the chip select training operation for the low pulses of the chip select signal. Additionally, or alternatively, one or more systems, devices, apparatuses, components, and/or controllers of FIG. 1 may be configured to perform one or more other operations described herein.

As indicated above, FIG. 1 is provided as an example. Other examples may differ from what is described with regard to FIG. 1. For example, some aspects described herein are broadly applicable to other circuits, including circuits that are fully contained on-die (e.g., within a system-on-chip (SoC)) and/or circuits associated with non-memory external interfaces (e.g., a serializer/deserializer (SerDes)).

Figure 2:
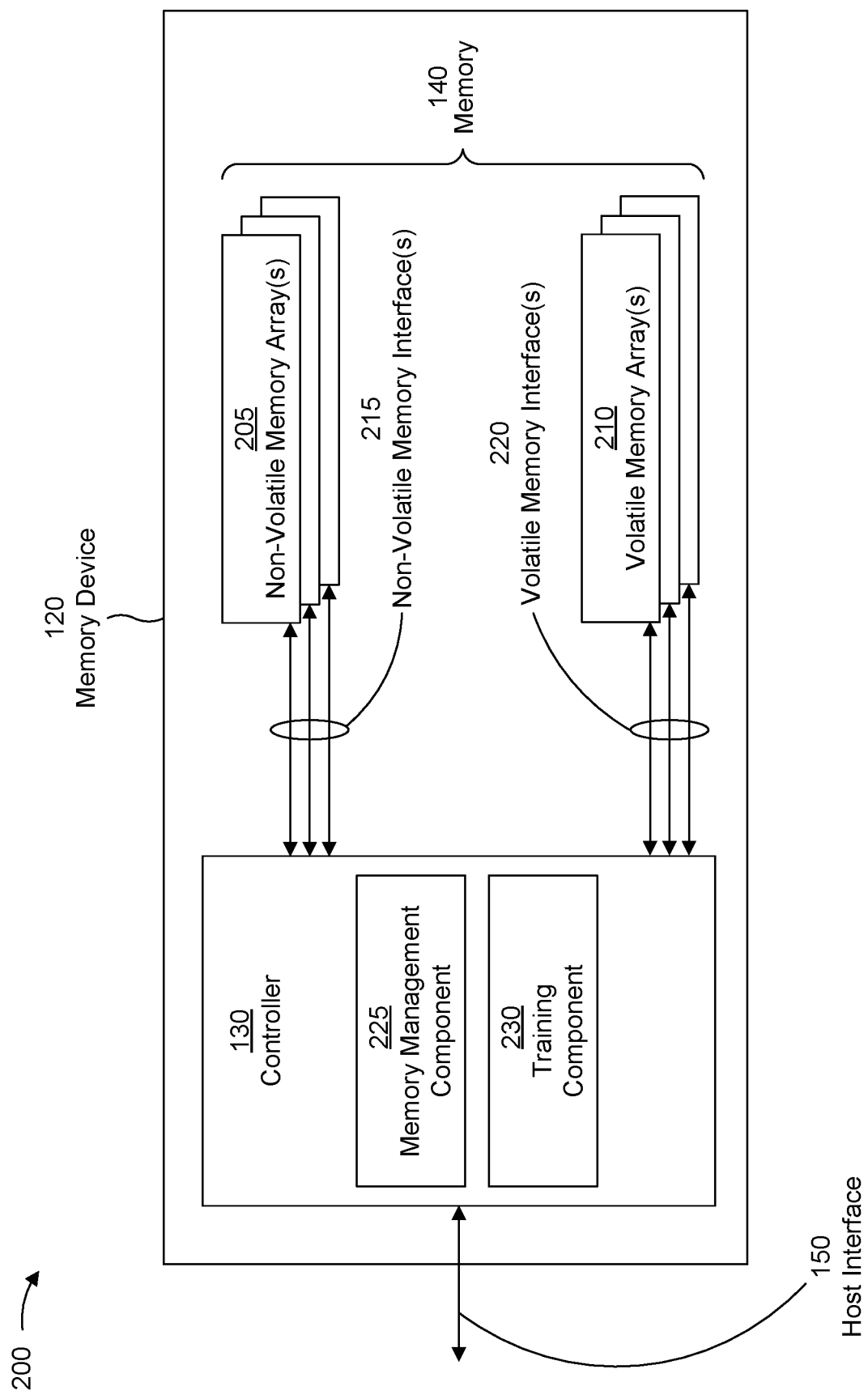
FIG. 2 is a diagram illustrating an example of components included in a memory device that may support enhanced chip select signal training, in accordance with the present disclosure.

FIG. 2 is a diagram illustrating an example 200 of components included in a memory device 120 that may support enhanced chip select signal training, in accordance with the present disclosure. As described above in connection with FIG. 1, the memory device 120 may include a controller 130 and memory 140. As shown in FIG. 2, the memory 140 may include one or more non-volatile memory arrays 205, such as one or more NAND memory arrays and/or one or more NOR memory arrays. Additionally, or alternatively, the memory 140 may include one or more volatile memory arrays 210, such as one or more SRAM arrays and/or one or more DRAM arrays. The controller 130 may transmit signals to and receive signals from a non-volatile memory array 205 using a non-volatile memory interface 215. The controller 130 may transmit signals to and receive signals from a volatile memory array 210 using a volatile memory interface 220.

The controller 130 may control operations of the memory 140, such as by executing one or more instructions. For example, the memory device 120 may store one or more instructions in the memory 140 as firmware, and the controller 130 may execute the one or more instructions stored in the memory 140. Additionally, or alternatively, the controller 130 may receive one or more instructions from the host device 110 via the host interface 150, and may execute those one or more instructions. In some aspects, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some aspects, execution of the set of instructions, by the controller 130, causes the controller 130 and/or the memory device 120 to perform one or more operations or methods described herein. In some aspects, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some aspects, the controller 130 may translate a host interface command (e.g., a command received from the host device 110) into a memory interface command (e.g., a command for performing an operation on a memory array).

As shown in FIG. 2, the controller 130 may include a memory management component 225, and/or a training component 230, among other examples. In some aspects, one or more of these components are implemented as one or more instructions (e.g., firmware) executed by the controller 130. Alternatively, one or more of these components may be implemented as dedicated integrated circuits distinct from the controller 130.

The memory management component 225 may be configured to manage performance of the memory device 120. For example, the memory management component 225 may perform wear leveling, bad block management, block retirement, read disturb management, and/or other memory management operations. In some aspects, the memory device 120 may store (e.g., in memory 140) one or more memory management tables. A memory management table may store information that may be used by or updated by the memory management component 225, such as information regarding memory block age, memory block erase count, and/or error information associated with a memory partition (e.g., a memory cell, a row of memory, a block of memory, or the like).

The training component 230 may be configured to perform one or more training operations for the memory device 120. For example, the training component 230 may perform command bus training. As an example, the training component 230 may perform CS signal training. For example, the training component 230 may sample pulses of a CS signal at a clock signal edge (e.g., a rising edge or a falling edge) and determine whether the pulses match expected pulses of the CS signal. If a sampled pulse of the CS signal matches an expected pulse (e.g., is a high pulse or a low pulse), then the training component 230 may determine a pass result for the sampled pulse. If a sampled pulse of the CS signal does not match an expected pulse (e.g., is not a high pulse or a low pulse as expected), then the training component 230 may determine a fail result for the sampled pulse.

One or more devices or components shown in FIG. 2 may be configured to perform operations described herein, such as one or more operations and/or methods described in connection with FIGS. 5-8. For example, the controller 130, the memory management component 225, and/or the training component 230 may be configured to perform one or more operations and/or methods for the memory device 120 as described herein.

For example, in some aspects, the memory device 120 may include means for receiving a clock signal having a first frequency; means for receiving, for a chip select training operation, a chip select signal having a pattern including high pulses and low pulses; means for performing, for a sampling window, the chip select training operation using the clock signal and the chip select signal (e.g., where the sampling window includes a quantity of pulses of the chip select signal); means for providing, via a first DQ pin, an indication of a first result of the chip select training operation for the high pulses of the chip select signal; and/or means for providing, via a second DQ pin, an indication of a second result of the chip select training operation for the low pulses of the chip select signal. In some aspects, the means for the memory device 120 to perform processes and/or operations described herein may include one or more components shown in FIG. 2, such as controller 130, the memory management component 225, and/or the training component 230, among other examples.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3:
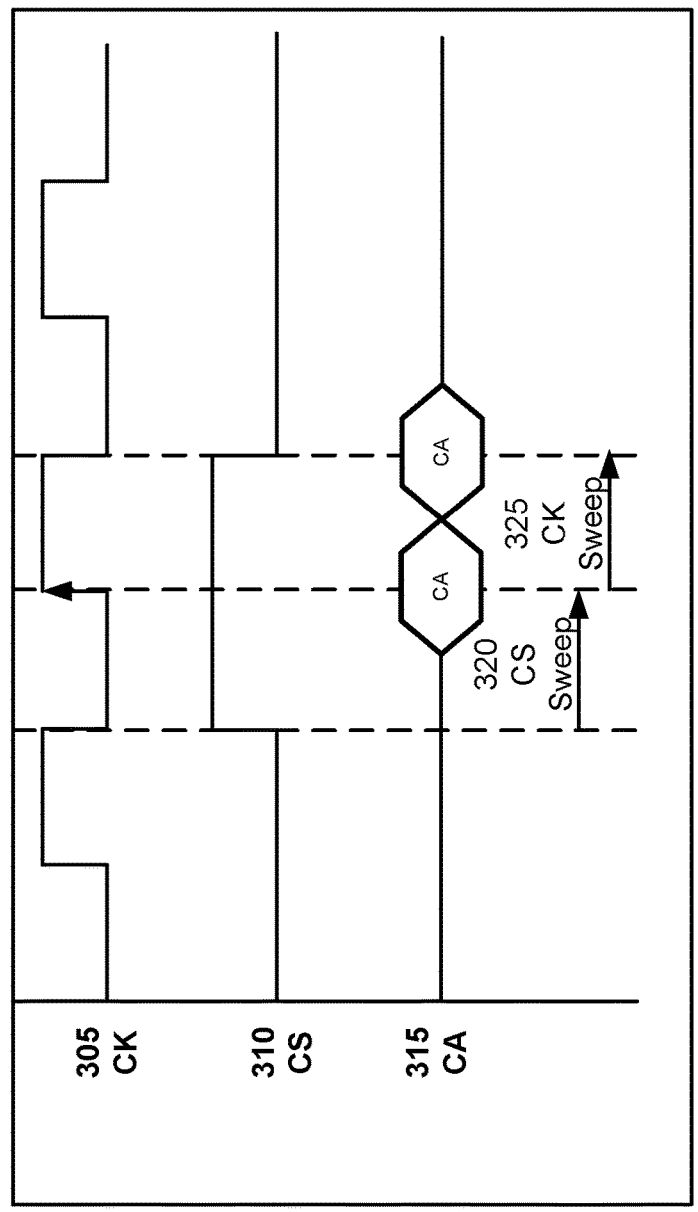
FIG. 3 is a diagram illustrating an example of command signaling for the memory device, in accordance with the present disclosure.

FIG. 3 is a diagram illustrating an example 300 of command signaling for the memory device 120, in accordance with the present disclosure. As shown in FIG. 3, the memory device 120 may receive (e.g., from the host device 110) a clock (CK) signal 305, a CS signal 310, and a CA signal 315. As described elsewhere herein, a CS may be used as a valid signal to indicate to the memory device 120 that a command is valid for the memory device 120. For example, if the CS signal 310 indicates active (e.g., a low pulse for some DDR versions (such as DDR5) or a high pulse for other DDR versions (such as LPDDR6)), then the memory device 120 may determine that a command via the command bus is valid (e.g., is intended for) the memory device 120. If the CS signal 310 indicates inactive (e.g., a high pulse for some DDR versions (such as DDR5) or a low pulse for other DDR versions (such as LPDDR6)), then the memory device 120 may determine that a command via the command bus is invalid (e.g., is not intended for) the memory device 120 (e.g., and the memory device 120 may ignore the command).

The CS should be trained, such that the CS is at a center of a cycle of the CK signal 305, which may ensure a proper margin on both sides of the CS. A host device 110 may perform a CS sweep that may allow the CS to be placed at the center of a cycle of the CK signal 305. Thus, the CS and CA(s) may be placed at the center of a cycle of the CK signal 305. For example, as shown in FIG. 3, the host device 110 may perform the CS sweep by systematically activating or deactivating each individual memory device 120 within the electronic device 100 while testing memory operations. For example, the CS sweep may be used for CA training. During a CS sweep 320, the memory device 120 may sample the CS signal 310 to determine a pass region (e.g., where the CS signal 310 has an expected pulse (high or low) in connection with the CA signal 315) and a fail region (e.g., where the CS signal 310 does not have an expected pulse in connection with the CA signal 315). During a CK sweep 325, the memory device 120 may determine a pass region and a fail region for the CK signal 305 with respect to the CA signal 315.

As described elsewhere herein, different versions of DDR may be associated with different capacities, different clock frequencies, and/or different data transfer rates (e.g., speeds), among other examples. For example, clock frequencies and/or speeds of DDR memory devices may increase in newer versions (or generations) of DDR. For example, in DDR5 (e.g., LPDDR5x (sometimes referred to as LP5x)), the memory device may support a maximum speed of 2.4 gigabits per second (Gbps). The CK signal 305 may have a frequency that is a reduced frequency with respect to a write clock (WCK) frequency. For example, for DDR5, a ratio of the frequency of the CK signal 305 to a frequency of the WCK may be 1-to-4. For example, the WCK frequency may be 4.8 GHz and the frequency of the CK signal 305 may be 1.2 GHz. The frequency of the CS signal 310 may be half the frequency of the CK signal 305 (e.g., because the CS signal 310 may be an SDR signal). For example, for DDR5, the CS signal 310 may have a frequency of 0.6 GHz. For DDR5, the CA signal 315 may have a frequency of 2.4 GHz. In LPDDR6, it is expected that the memory device may support a maximum speed of 6.4 Gbps and a WCK frequency of 6.4 GHz. Additionally, the frequency of the CK signal 305 may have a different ratio with respect the WCK frequency, such as a 1-to-2 ratio (e.g., in LPDDR6, the CK signal 305 may have a frequency of 3.2 GHz and the CS signal 310 may have a frequency of 1.6 GHz). For LPDDR6, the CA signal 315 may have a frequency of 6.4 GHz. The increased data rates (e.g., speeds) and/or frequencies may introduce additional challenges and/or complexities for training command signaling. For example, robust training may be needed to reduce a likelihood of ISI, cross-talk, and/or voltage noise, among other examples. Additionally, for LPDDR6, the CA signal 315 may use a long burst pattern, rather than a single cycle pattern (e.g., a single clock cycle pattern), because of the increased speed and/or frequencies. Because of the long burst pattern, current CS signal training operations may be insufficient for training the CS signal 310.

As indicated above, FIG. 3 is provided as an example. Other examples may differ from what is described with respect to FIG. 3.

Figure 4:
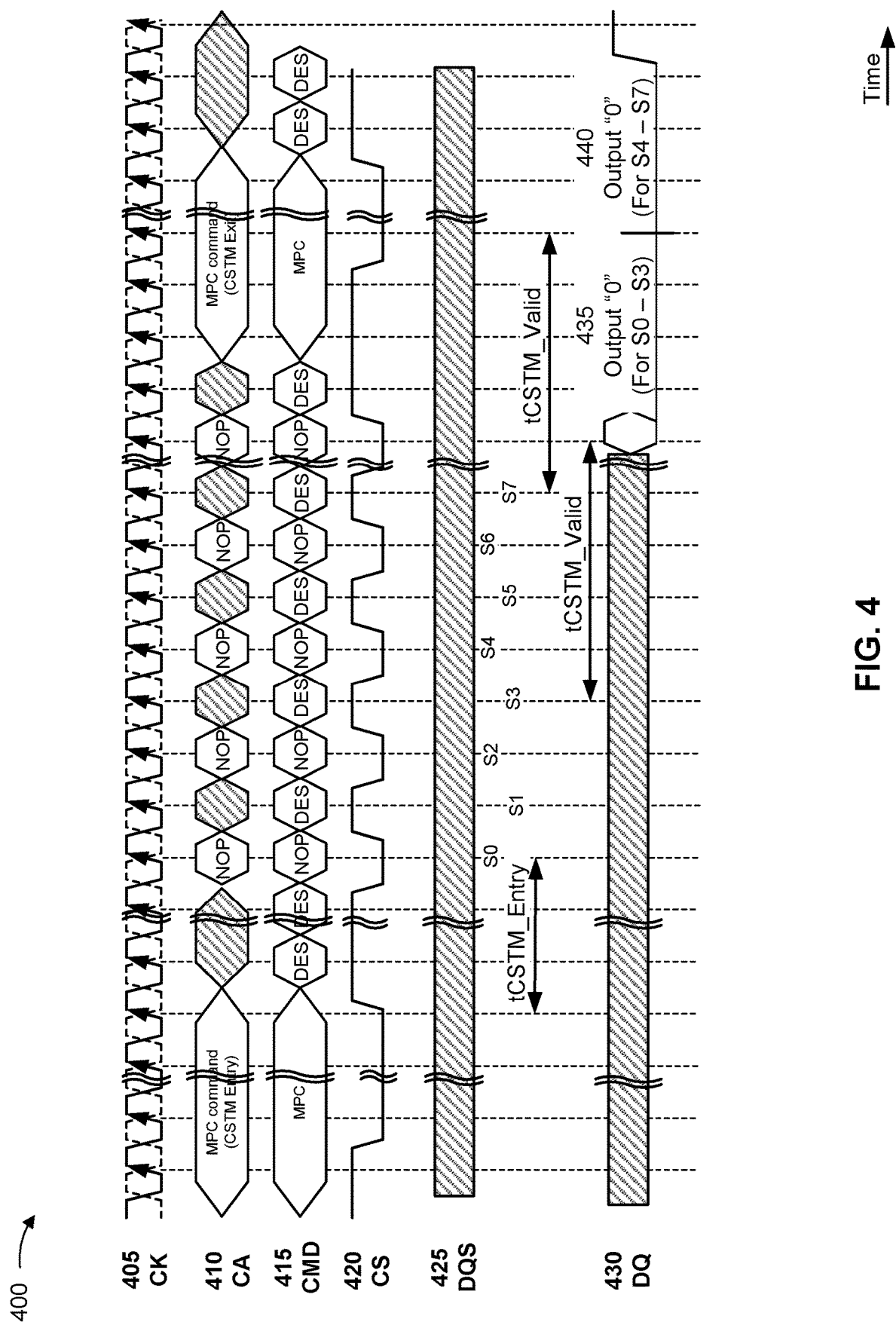
FIG. 4 is a diagram illustrating an example of chip select signal training, in accordance with the present disclosure.

FIG. 4 is a diagram illustrating an example 400 of CS signal training, in accordance with the present disclosure. The operations depicted and/or described in connection with FIG. 4 may be performed by the electronic device 100 and/or the memory device 120. Example 400 depicts an example CSTM (e.g., for DDR5).

As shown in FIG. 4, the memory device 120 may receive (e.g., from a host device 110) a CK signal 405. The CK signal 405 may include a primary CK signal and a complementary CK signal (e.g., the complementary CK signal is shown in dashed lines in FIG. 4). The memory device 120 may receive a CA signal 410 indicating one or more commands (CMDs) 415. The memory device 120 may receive (e.g., from a host device 110) a CS signal 420. The memory device 120 may receive (e.g., from a host device 110) a data strobe signal (DQS) 425. The DQS 425 may include complementary DQS_t and DQS_c signals. The memory device 120 may provide results of the CS training operation via a DQ pin 430 (e.g., to the host device 110).

In some examples, the host device 110 or a memory controller may enable or initiate the CS signal training operation (e.g., the CSTM) by sending a multi-purpose command (MPC) with an operation code (opcode) for CSTM entry. Similarly, the host device 110 or a memory controller may disable or end the CS signal training operation (e.g., the CSTM) by sending an MPC with an opcode for CSTM exit. As shown in FIG. 4, the CA signal 410 includes a CSTM entry command and a CSTM exit command. The CMD 415 depicts the command that is decoded by the memory device 120 based on the signals of CA signal 410. In some examples, CSTM enter is controlled by an MPC, which can be issued by writing a multipurpose register of a mode register. The CSTM enter command can be triggered by writing a specific bit pattern to the multipurpose register.

In some examples, the MPC command extends multiple CK signal cycles, during which the CS signal 420 is asserted. For example, when the memory device 120 device is in the CSTM, commands may be actively processed. In one example, the only commands that should be sent by the host device 110 while CSTM is enabled are a no operation (NOP) command and the MPC to exit CSTM. For example, other commands sent and processed prior to training the CS signal 420 may produce unreliable results. In one embodiment, during the CSTM mode, the host device 110 may hold or maintain the signal lines of the CA signal 410 at a NOP (no operation) command encoding. An "assertion" of a CS signal may refer to the CS signal being set to a value (e.g., high or low) indicating that a memory device or chip is selected to perform a command. A "deassertion" of a CS signal may refer to the CS signal being set to a value (e.g., high or low) indicating that a memory device or chip is not selected to perform a command. As seen in the CMD 415 line, the difference between a NOP command and a deselect (DES) command is the assertion or deassertion of the CS line (e.g., the CS signal 420). In the example 400, the memory device 120 may use an active low CS signal 420 where the CS signal is considered to be asserted when the CS signal 420 is "low" and considered to be deasserted when the CS signal 420 is "high." In other examples, the memory device 120 may use an active high CS signal 420 where the CS signal is considered to be asserted when the CS signal 420 is "high" and considered to be deasserted when the CS signal 420 is "low."

The CS signal training operation depicted by example 400 may be used to align the CS signal 420 with the CK signal 405. For example, the host device 110 may transmit the CS signal 420 with a defined pulse pattern, such as a "01010101" clock-like pattern where "0" represents a low pulse of the CS signal 420 and "1" represents a high pulse of the CS signal 420. For example, during the CS signal training operation, the memory device 120 may sample the CS signal 420 on the rising edge (or the falling edge in other examples) of the CK signal 405. The memory device 120 may compare the sample to the defined pulse pattern to determine whether the CS signal 420 has the expected high or low pulse for the sample.

For example, after the memory device 120 has CSTM enabled, the memory device 120 may begin sampling on every rising CK edge, starting with a rising edge of the CK signal 405 after a delay shown by "tCSTM_Entry" in FIG. 4. The tCSTM_Entry represents a delay period that can begin after an amount of time that the CS signal 420 is held low to register an entry command (e.g., tCSTM_CS_Entry), which in turn initiates after a delay of setup time for transitioning from a command to a low pulse of the CS signal 420 (e.g., tCSTM_SU). In some examples, the memory device 120 may sample the CS signal 420 with groups of four samples each. In other examples, the groups may include a different quantity of samples. In some examples, the sampling of 4-sample groups loops consecutively. For example, a first group may include samples S0, S1, S2, and S3 and a second group may include samples S4, S5, S6, and S7. Depending on the values of the samples, the memory device 120 may drive the signal of the DQ pin 430 high or low to indicate a result of the CS signal training operation. More or fewer samples can be used in other examples. In some examples, the memory device 120 may consider samples as primary samples and secondary samples. The even samples (S0, S2, S4, S6, and so on) can be considered the primary samples in the example 400, although it will be understood that such a designation can be arbitrary, and the initiation of sampling can begin at an arbitrary time.

As shown in FIG. 4, the delay from when the CS signals are sampled during the last CK rising edge for a group (sample S3) to when the output of the sample evaluation is driven to a stable value on the DQ pin 430 is specified as tCSTM_Valid. There is likewise another delay period of tCSTM_Valid between sample S7 and a second output. The memory device drives the outputs as either zero or one depending on the transition of samples. For example, if all of the samples in a group pass (e.g., have expected values), then the memory device 120 may cause the DQ pin 430 to have a signal value of zero ("0") to indicate a pass result for the CS training operation. If one or more of the samples in a group fail (e.g., do not have expected values), then the memory device 120 may cause the DQ pin 430 to have a signal value of one ("1") to indicate a fail result for the CS training operation. The host device 110 may obtain the result(s) via the DQ pin 430 to determine whether the CS signal 420 aligns with the CK signal 405. The host device 110 may perform other CS training operations using CS signals having different delays (e.g., relative to the CK signal 405) to determine a timing of the CS signal 420 that best aligns with the CK signal 405.

As shown in FIG. 4, the result for a given group of samples (e.g., two or more samples) may only persist on the DQ pin 430 for a limited amount of time. For example, after a certain amount of time (e.g., an amount of time associated with sampling the next group of samples), a result for a given group of samples may be overwritten by the result for the next group of samples. For example, a result 435 for the group of samples including S0, S1, S2, and S3 may be overwritten on the DQ pin 430 by an output 440 for the group of samples including S4, S5, S6, and S7. As an example, the result 435 may be present on the DQ pin 430 for only two clock cycles. As a frequency of the CK signal 405 increases (e.g., for newer generations or versions of DDR), the amount of time for which an output is present on the DQ pin 430 decreases. This introduces complexities associated with the host device 110 reading the output via the DQ bus before the output is overwritten or removed. Additionally, as shown in FIG. 4, after a last group of samples of the CS signal 420 is sampled, the CS signal 420 may be switched to a deasserted state. This may result in the memory device 120 switching the signal value on the DQ pin 430 to indicate a fail result (e.g., because the CS signal 420 may stay in the deasserted state for multiple clock cycles) because the CSTM has not yet been exited (e.g., as indicated by an MPC command via the CA signal 410). Therefore, an inaccurate result may be indicated via the DQ pin 430 and the result for the last group of samples may be quickly overwritten on the DQ pin 430 by the inaccurate result.

Additionally, the results provided via the DQ pin 430 may indicate, to the host device 110, that at least one sample in a group of samples of the CS signal 420 failed. However, the result may not indicate which sample failed, or whether the sample was a CS high sample or a CS low sample. As a result, the host device 110 may be unable to determine whether a channel for the CS high samples or a channel for the CS low samples is experiencing misalignment with the CK signal 405.

As indicated above, FIG. 4 is provided as an example. Other examples may differ from what is described with respect to FIG. 4.

Figure 5:
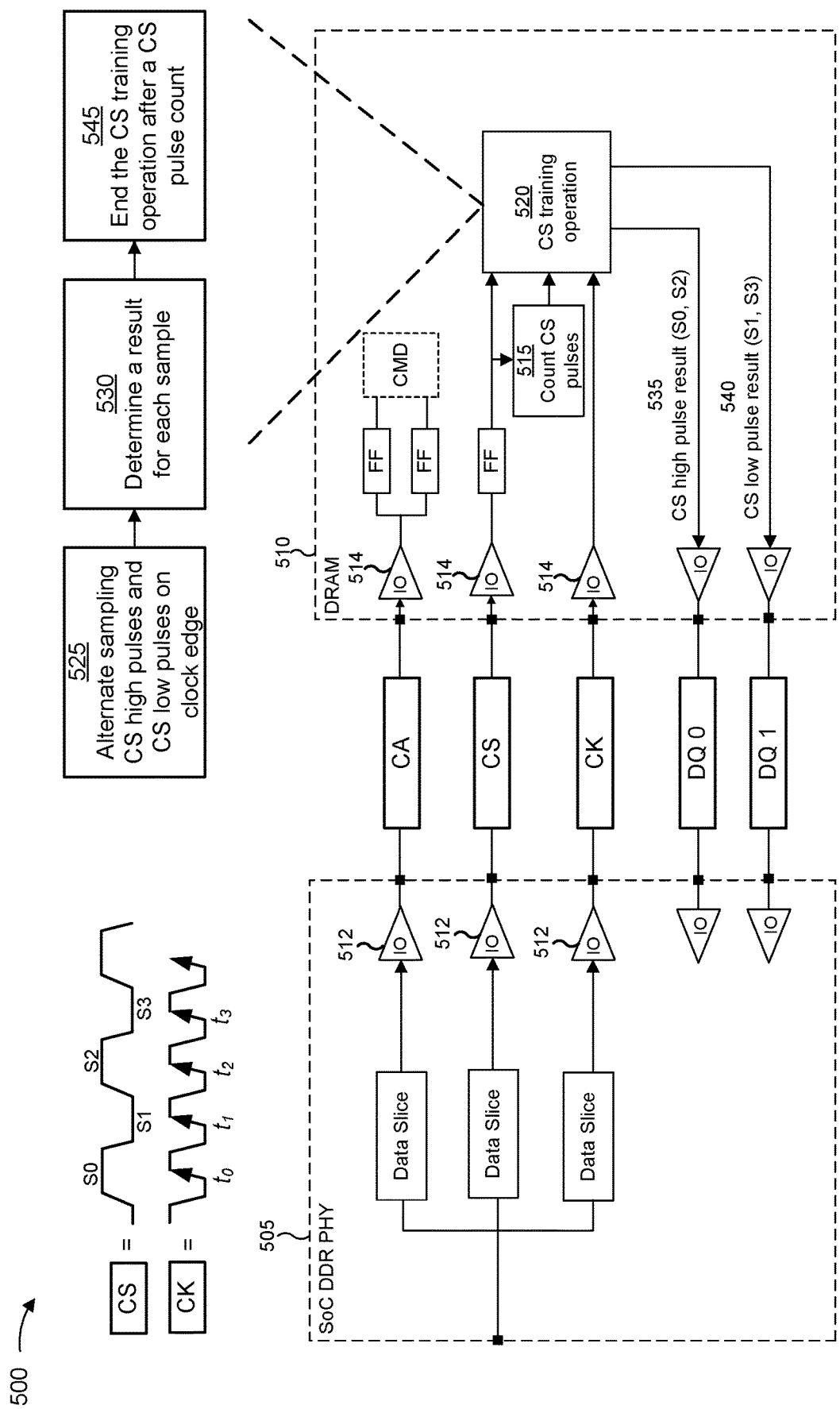
FIG. 5 is a diagram illustrating an example of enhanced chip select signal training, in accordance with the present disclosure.

FIG. 5 is a diagram illustrating an example 500 of enhanced CS signal training, in accordance with the present disclosure.

As shown in FIG. 5, a DDR circuit may include a system on chip (SoC) component 505 corresponding to a DDR PHY component (e.g., a physical layer interface circuit), where the SoC component 505 may include a set of I/O drivers 512 (or I/O transmitters (Tx) or IO receivers (Rx)). In some aspects, the SoC component 505 may be, or may be included in, a host device (e.g., the host device 110). In some aspects, when the SoC component 505 is interfacing with a memory device 120 (such as a DRAM device 510 as shown in FIG. 5), the DDR PHY component may be included in the controller of the memory device 120 (e.g., controller 130 in FIG. 1 and/or FIG. 2).

As further shown in FIG. 5, the DRAM device 510 may include a set of I/O drivers 514 (e.g., IO receivers (Rx)) that receive the signals provided by the I/O drivers 512 of the SoC component 505. For example, as shown, the DRAM device 510 includes a first I/O driver 514 that is configured to receive a CA signal, a second I/O driver 514 that is configured to receive a CS signal, and a third I/O driver 514 that is configured to receive a CK signal. The DRAM device 510 may include one or more flip-flop (FF) components, as shown in FIG. 5.

For example, the SoC component 505 may transmit, and the DRAM device 510 may receive, a CK signal. The CK signal may have a frequency (e.g., a first frequency). In some aspects, the frequency of the CK signal may be based on a write clock frequency of the system. For example, the frequency of the CK signal may be less than or equal to the write clock frequency. In some aspects, the frequency of the CK signal may be half of the write clock frequency, such as for LPDDR6. In other DDR versions, the frequency of the CK signal may be another proportion of the write clock frequency.

The SoC component 505 may transmit, and the DRAM device 510 may receive, a CS signal. The CS signal may have a pattern including high pulses and low pulses for a CS training operation (e.g., a CS signal training operation). For example, the SoC component 505 may toggle the CS signal between high and low pulses. For example, the CS signal may be configured to toggle between the high and low pulses at an edge (e.g., a rising edge or a falling edge) of the CK signal. In some aspects, the SoC component 505 may transmit the CS signal with a given delay relative to the CK signal. The SoC component 505 may determine the delay based on previously performed CS training operations (e.g., performed with different delays). For example, if DRAM device 510 indicates a failure for a CS signal transmitted using a first delay, then the SoC component 505 may perform another CS training operation using a CS signal having a second delay relative to the CK signal. This may enable the SoC component 505 to determine a delay of the CS signal that causes the CS signal to best align with the CK signal as received by the DRAM device 510.

In some aspects, the SoC component 505 may transmit, and the DRAM device 510 may receive, a command to initiate a CS training operation (e.g., via the CA). The command may be a command to enter a CSTM. The command may be an MPC command, a mode register write (MRW) command, or another type of command. In some aspects, to enter the CS training operation (e.g., to enter the CSTM), the DRAM device 510 may modify a frequency of the CK signal. For example, the CS training operation may be associated with a low frequency entry, as depicted and described in more detail in connection with FIG. 6. For example, the DRAM device 510 may reduce, prior to performing the chip select training operation, the frequency of the CK signal from a first frequency to a second frequency. The DRAM device 510 may receive, in association with reducing the first frequency, an indication that the chip select training operation is enabled (e.g., an MPC command or an MRW command with an opcode of CSTM entry). For example, the CA may include multi-cycle commands (e.g., commands transmitted over multiple CK cycles). In some aspects, a command to enter (or exit) the CS training operation (or another command bus training operation) cannot be extended (unlike other DDR versions, such as DDR5, that use single-cycle commands). Therefore, by reducing the clock frequency, a likelihood that the electronic device is able to read or capture the commands to enter or exit the CS training operation (or another command bus training operation) may be improved (e.g., because the multi-cycle commands may be present for a longer amount of time with the reduced clock frequency), such as when higher clock frequencies are used (e.g., in LPDDR6 or other DDR versions).

Based on receiving the command to initiate the CS training operation (e.g., to enter the CSTM), the DRAM device 510 may perform a CS training operation. For example, a given time (e.g., that may be configured by the SoC component 505 or otherwise defined) after the DRAM device 510 receives the command to initiate the CS training operation, the DRAM device 510 may begin sampling the CS signal. As shown in FIG. 5, the DRAM device 510 may obtain one or more samples of the CS signal, shown as S0, S1, S2, and S3. In some aspects, the DRAM device 510 may obtain at least one sample of a high pulse of the CS signal and at least one sample of a low pulse of the CS signal.

In some aspects, the DRAM device 510 may perform the CS training operation for a defined sampling window. The sampling window may include a given quantity of pulses of the CS signal. A pulse of the CS signal may correspond to a sample. As an example, the CS signal shown in FIG. 5 has four pulses. "Pulse" may refer to a high pulse (e.g., a high pulse width) or a low pulse (e.g., a low pulse width). The quantity of pulses included in a sampling window for the CS training operation may be signaled or configured by the SoC component 505. For example, the SoC component 505 may transmit, and the DRAM device 510 may receive, an indication of the quantity of pulses of the CS signal included in the sampling window. For example, the SoC component 505 may define the total quantity of CS pulses in a sampling window. As an example, a sampling window for a CS training operation may include two CS pulses, four CS pulses, eight CS pulses, twelve CS pulses, sixteen CS pulses, thirty-two CS pulses, or another defined quantity of CS pulses.

Additionally, or alternatively, the quantity of pulses included in a sampling window for the CS training operation may be determined (e.g., learned) by the DRAM device 510. For example, the DRAM device 510 may determine the quantity of pulses using CS signals associated with one or more CS training operations performed prior to the current CS training operation. For example, the DRAM device 510 may count the quantity of pulses that were transmitted in one or more previously performed CS training operations. The DRAM device 510 may store an indication of the quantity of pulses to be included in the sampling window. This enables the DRAM device 510 to determine when to stop sampling the CS signal (e.g., prior to receiving a command to exit or end the CS training operation). This may reduce a likelihood that an inaccurate CS training operation result is indicated by the DRAM device 510 via sampling the CS signal after the pulse pattern of the CS signal has ended.

As shown by reference number 515, the DRAM device 510 may count the CS pulses received during the CS training operation. This may enable the DRAM device 510 to determine when to stop sampling the CS signal for the CS training operation. As shown by reference number 520, the DRAM device 510 may perform the CS training operation using the CK signal and the CS signal. For example, the DRAM device 510 may sample the CS signal at a rising edge or a falling edge of the CK signal.

As shown by reference number 525, the DRAM device 510 may alternate sampling CS high pulses and CS low pulses on clock edges. For example, the DRAM device 510 may alternate between reading (e.g., sampling) the high pulses and the low pulses of the CS signal on rising edges (or falling edges) of the CK signal. As an example, the DRAM device 510 may read (e.g., sample) the high pulses of the CS signal (e.g., S0 and S2, as shown in FIG. 5) on even rising edges of the clock signal. The DRAM device 510 may read (e.g., sample) the low pulses of the CS signal (e.g., S1 and S3, as shown in FIG. 5) on odd rising edges of the CK signal. In other examples, the DRAM device 510 may read (e.g., sample) the high pulses of the CS signal on odd rising edges of the CK signal and may sample the low pulses of the CS signal on even rising edges of the clock signal. "Even" and "odd" edges of the CK signal may refer to index values of a clock cycle. For example, assuming that a CS training operation begins at a CK cycle $t_0$, the next cycles may be denoted $t_1$, $t_2$, $t_3$, and so on. In such examples, the even rising edges may be the rising edges in cycles $t_0$ and $t_2$. The odd rising edges may be the rising edges in cycles $t_1$ and $t_3$. For example, the DRAM device 510 may check a CS high pulse width on even rising edges of the CK signal. The DRAM device may check a CS low pulse width on odd rising edges of the CK signal.

As shown by reference number 530, the DRAM device 510 may determine a result for each sample of the CS signal. For example, the DRAM device 510 may compare a voltage of the sampled CS signal to an expected voltage. For samples of high pulses of the CS signal, the DRAM device 510 may compare the voltage of a given sample to a high voltage value associated with the high pulses. If the voltage of the given sample does not satisfy a high pulse threshold (e.g., is less than the high voltage value), then the DRAM device 510 may determine that a result for the sample is a fail result. If the voltage of the given sample satisfies the high pulse threshold (e.g., is greater than or equal to the high voltage value), then the DRAM device 510 may determine that a result for the sample is a pass result. Similarly, for samples of low pulses of the CS signal, the DRAM device 510 may compare the voltage of a given sample to a low voltage value associated with the high pulses. If the voltage of the given sample does not satisfy a low pulse threshold (e.g., is greater than the low voltage value), then the DRAM device 510 may determine that a result for the sample is a fail result. If the voltage of the given sample satisfies the low pulse threshold (e.g., is less than or equal to the low voltage value), then the DRAM device 510 may determine that a result for the sample is a pass result.

The DRAM device 510 may maintain results of CS high pulses and CS low pulses on different DQ pins (e.g., different data output pins). For example, the DRAM device may return the odd and even results (e.g., results from samples on odd rising edges of the CK signal and results from samples on even rising edges of the CK signal) on separate DQ pins. For example, the DRAM device 510 may loop consecutively with N-sample groups (such as a four sample group as shown in FIG. 5) and record the failure (if any) of the sample fail on a corresponding DQ pin. As shown by reference number 535, the DRAM device 510 may return (or provide) a result for CS high pulses (or for samples obtained on even edges of the CK signal) via a first DQ pin. As shown by reference number 540, the DRAM device 510 may return (or provide) a result for CS low pulses (or for samples obtained on odd edges of the CK signal) via a second DQ pin.

For example, if a failure is detected for a CS high pulse (or for a sample obtained on an even rising CK edge), then the DRAM device 510 may change a value of a first DQ pin (shown as DQ 0 in FIG. 5) to indicate the failure (such as by changing a value of the DQ pin to one (1)). If a failure is detected for a CS low pulse (or for a sample obtained on an odd rising CK edge), then the DRAM device 510 may change a value of a second DQ pin (shown as DQ 1 in FIG. 5) to indicate the failure (such as by changing a value of the DQ pin to one (1)).

If a failure is detected, then the DRAM device 510 may maintain the indication of the failure on the corresponding DQ pin for at least the duration of the CS training operation. In other words, an indication of a failure may be persistently maintained on the corresponding DQ pin (e.g., even if subsequent samples of the CS signal have a pass result). For example, the DRAM device 510 may detect a failure associated with a high pulse of the CS signal. The DRAM device 510 may cause indication of the failure to be persistently indicated via the first DQ pin for at least the sampling window. Similarly, the DRAM device 510 may detect a failure associated with a low pulse of the CS signal. The DRAM device 510 may cause indication of the failure to be persistently indicated via the second DQ pin for at least the sampling window. In some aspects, the DRAM device 510 may maintain the values indicated by respective DQ pins until a next CS training operation. For example, the DRAM device 510 may reset the values of the DQ pins in response to receiving another command to initiate a CS training operation (e.g., another MPC or MRW command indicating CSTM entry).

The SoC component 505 may read the values of the DQ pins before sending a next CS toggle pattern. For example, persistently indicating the results of the CS training operation on the DQ pins may enable the SoC component to determine failure(s) of the CS training operation (e.g., because the results are not quickly overwritten with results for a next sample group). Additionally, because results for CS high pulses and CS low pulses are indicated via different DQ pins, the SoC component 505 may determine whether a failure was associated with a CS high pulse or a CS low pulse. This may enable the SoC component 505 to tailor a next CS toggle pattern or better determine a next CS toggle pattern to more accurately align with the CK signal. This may reduce the amount of time, and/or conserve resources (e.g., processing resources or power resources) associated with CS training operations.

As shown by reference number 545, the DRAM device 510 may end the CS training operation after a CS pulse count. For example, the DRAM device 510 may end the CS training operation after receiving the quantity of pulses included in the defined sampling window. In other words, the DRAM device 510 may begin sampling the CS signal when CSTM is enabled and may stop sampling the CS signal after a fixed count of CS pulses. For example, the DRAM device 510 may receive an indication that the chip select training operation is enabled (e.g., via the CA, such as in an MPC command or an MRW command). The DRAM device 510 may sample the CS signal for the quantity of pulses included in the sampling window. The DRAM device 510 may stop (e.g., may refrain from) sampling, for the CS training operation, the CS signal after the quantity of pulses have been sampled. This may reduce a likelihood that the DRAM device 510 incorrectly changes a result indicated by one or more DQ pins because the toggle pattern of the CS signal has ended. Further, this may conserve resources (e.g., processing resources and/or power resources) of the DRAM device 510 that would have otherwise been used to sample the CS signal after the toggle pattern of the CS signal has ended.

In some aspects, the SoC component 505 may transmit, and the DRAM device 510 may receive, a command to end the CS training operation (e.g., via the CA). The command may be a command to exit a CSTM. The command may be an MPC command, an MRW command, or another type of command. In some aspects, to exit the CS training operation (e.g., to exit the CSTM), the DRAM device 510 may modify a frequency of the CK signal. For example, the CS training operation may be associated with a low frequency exit, as depicted and described in more detail in connection with FIG. 6. For example, the DRAM device 510 may reduce, after performing the chip select training operation, the frequency of the CK signal from a first frequency to a second frequency. In some aspects, the DRAM device 510 may reduce, after sampling the quantity of samples included in the sampling window, the frequency of the CK signal from the first frequency to the second frequency The DRAM device 510 may receive, in association with reducing the first frequency, an indication that the chip select training operation is disabled (e.g., an MPC command or an MRW command with an opcode of CSTM exit). By reducing the clock frequency, a likelihood that the electronic device is able to read or capture the commands to exit the CS training operation (or another command bus training operation) may be improved (e.g., because the multi-cycle commands on the CA may be present for a longer amount of time with the reduced clock frequency), such as when higher clock frequencies are used (e.g., in LPDDR6 or other DDR versions).

As indicated above, FIG. 5 is provided as an example. Other examples may differ from what is described with respect to FIG. 5.

Figure 6:
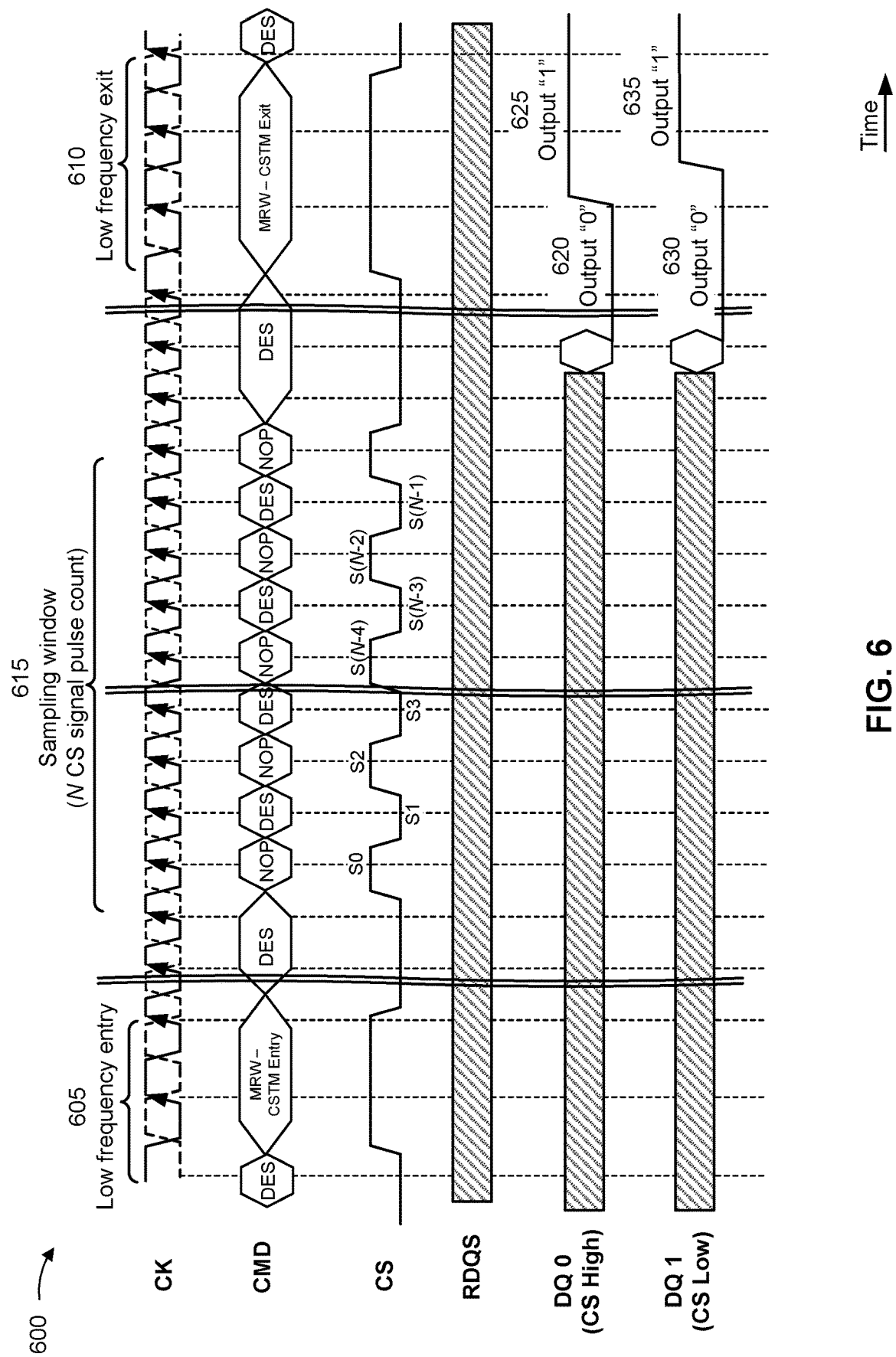
FIG. 6 is a diagram illustrating an example of enhanced chip select signal training, in accordance with the present disclosure.

FIG. 6 is a diagram illustrating an example 600 of enhanced CS signal training, in accordance with the present disclosure. The operations depicted and/or described in connection with FIG. 6 may be performed by the electronic device 100 and/or the memory device 120.

As shown in FIG. 6, a CS training operation (e.g., a CSTM) may be associated with a low frequency entry 605 and/or a low frequency exit 610. "Low frequency" entry or exit may refer to a period of time during which the memory device 120 (e.g., the DRAM device 510) modifies (e.g., reduces) a frequency of the CK signal. For example, for the low frequency entry 605, the memory device 120 may reduce the frequency of the CK signal based on, in response to, or otherwise associated with receiving a command indicating to initiate a CS training operation or CSTM entry (e.g., an MRW command as shown in FIG. 6). For example, the memory device 120 may reduce the frequency of the CK signal to improve a likelihood that the memory device 120 is able to obtain all of the data indicated by the command. For the low frequency exit 610, the memory device 120 may reduce the frequency of the CK signal based on, in response to, or otherwise associated with receiving a command to end the CS training operation or CSTM exit (e.g., an MRW command as shown in FIG. 6). Additionally, or alternatively, the memory device 120 may reduce the frequency of the CK signal based on, in response to, or otherwise associated with determining that a sampling window 615 for the CS training operation has ended.

As described elsewhere herein, the CS training operation (e.g., the CSTM) may be associated with a defined sampling window 615 that includes a defined quantity of samples of the CS signal (e.g., N samples, as shown in FIG. 6). The sampling window 615 (e.g., the quantity of samples to be included in the sampling window) may be configured by a host device (e.g., the SoC component 505). Additionally, or alternatively, the memory device 120 may determine the quantity of samples to be included in the sampling window by counting samples associated with one or more previously performed CS training operations. As shown in FIG. 5, the CMDs decoded by the memory device 120 may include a deselect (DES) (such as when the CS signal indicates that the memory device 120 is not selected), the MRW or MPC command(s) for entering or exiting the CS training operation, and a no operation (NOP) command. The host device may transmit, and the memory device 120 may receive, a read data strobe (RDQS) signal during the CS training operation.

As shown in FIG. 6, the CS signal may be toggled between high (e.g., high voltage) pulses and low (e.g., low voltage) pulses. The memory device 120 may sample the CS signal at rising edges of the clock signal. As shown in FIG.

6, the frequency of the clock signal may not be modified during the CS training operation (e.g., unlike during the low frequency entry 605 or the low frequency exit 610). The memory device 120 may alternate between sampling high pulses (e.g., a high pulse width) of the CS signal and low pulses (e.g., a low pulse width) on edges (e.g., rising edges) of the CK signal. For example, during the sampling window 615, the memory device 120 may obtain N samples of the CS signal (e.g., shown as S0 to S(N−1) in FIG. 6). After obtaining the N samples of the CS signal, the memory device 120 may end the CS training operation (e.g., may refrain from obtaining any additional samples of the CS signal). In some aspects, a value of N may be more or less than depicted in FIG. 6. For example, N may be two, four, six, eight, twelve, sixteen, thirty-two, or another number.

As shown in FIG. 6, the memory device 120 (e.g., the DRAM device 510) may provide results of the CS training operation on different DQ pins (e.g., shown as DQ 0 and DQ 1 in FIG. 6). For example, for samples obtained on even edges of the CK signal, the memory device 120 may provide output results via a first DQ pin (e.g., DQ 0). For samples obtained on odd edges of the CK signal, the memory device 120 may provide output results via a second DQ pin (e.g., DQ 1). In other words, the memory device 120 may provide results of the CS training operation for high pulses (e.g., high pulse widths) and low pulses (e.g., low pulse widths) of the CS signal on separate (e.g., different) DQ pins. For example, the memory device 120 may provide results of the CS training operation for high pulses of the CS signal (e.g., S0, S2, S(N−4), and S(N−2) as shown in FIG. 6) on a first DQ pin (e.g., DQ 0) and results of the CS training operation for low pulses (e.g., S1, S3, S(N−3), and S(N−1) as shown in FIG. 6) of the CS signal on a second DQ pin (e.g., DQ 0).

For example, the memory device 120 may provide a first output 620 on the first DQ pin indicating a pass result for CS high pulses (e.g., assuming one or more samples of the CS high pulse width are determined to pass). If the memory device 120 detects a failure associated with a CS high pulse width, then the memory device 120 may cause the first DQ pin to indicate a second result 625 (shown as Output "1") indicating the fail result. If a failure is detected, the memory device 120 may cause the second result 625 to be persistently indicated on the first DQ pin, even if a subsequent sample passes. For example, if the failure is associated with the sample S2 and the samples S(N−4) and/or S(N−2) are determined to pass, the memory device 120 may continue to indicate the failure via the first DQ pin. The failure may be indicated via the first DQ pin at least for the duration of the CS training operation. In some examples, the value (or result) indicated via the DQ pins may remain until a next CS training operation is triggered (e.g., until the memory device 120 receives another command indicating CSTM entry).

Similarly, the memory device 120 may provide a third output 630 on the second DQ pin indicating a pass result for CS low pulses (e.g., assuming one or more samples of the CS low pulse width are determined to pass). If the memory device 120 detects a failure associated with a CS low pulse width, then the memory device 120 may cause the second DQ pin to indicate a fourth result 635 (shown as Output "1") indicating the fail result. If a failure is detected, the memory device 120 may cause the fourth result 635 to be persistently indicated on the first DQ pin, even if a subsequent sample passes. For example, if the failure is associated with the sample S1 and the sample S3 is determined to pass, the memory device 120 may continue to indicate the failure via the second DQ pin.

After determining that the sampling window 615 has ended (e.g., after collecting and/or evaluating the N samples of the CS signal), the memory device 120 may refrain from changing values indicated by the DQ pins. This provides additional time for the host device (e.g., the SoC component 505) to obtain the results of the CS training operation. Additionally, by providing the results via separate DQ pins, the host device may determine whether a failure is associated with a CS high pulse or a CS low pulse. This may enable the host device to better determine a next CS toggle pattern for a next CS training operation (e.g., to better align the CS signal with the CK signal and/or to adjust one (or both) of the CS high pulse width or the CS low pulse width), resulting in more efficient CS training.

The host device and the memory device 120 may perform one or more additional CS training operations (e.g., using different CS toggle patterns, different pulse widths, and/or different delays of the CS signal) in a similar manner as described herein to determine a CS signal that best aligns with the CK signal. After training the CS signal (e.g., after determining a CS signal that best aligns with the CK signal), the host device and the memory device 120 may perform one or more memory operations using the trained CS signal (e.g., to indicate whether the memory device 120 is selected or deselected for one or more commands indicated via a shared command bus).

As indicated above, FIG. 6 is provided as an example. Other examples may differ from what is described with respect to FIG. 6.

Figure 7:
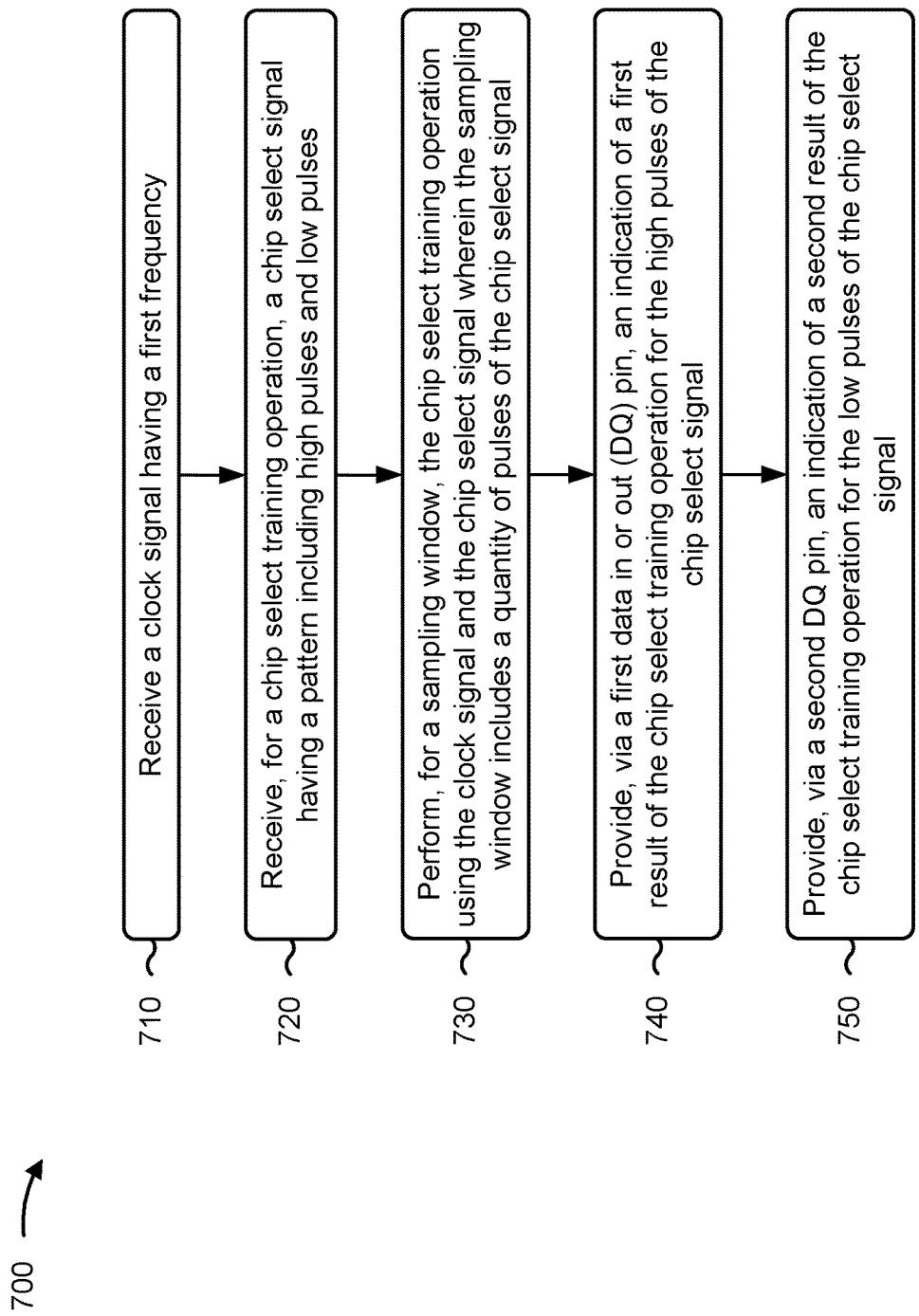
FIG. 7 is a flowchart of an example process associated with enhanced chip select signal training, in accordance with the present disclosure.

FIG. 7 is a flowchart of an example process 700 associated with enhanced chip select signal training, in accordance with the present disclosure. In some aspects, one or more process blocks of FIG. 7 are performed by an electronic device (e.g., electronic device 100). In some aspects, one or more process blocks of FIG. 7 are performed by a memory device (e.g., the memory device 120 or the DRAM device 510). In some aspects, one or more process blocks of FIG. 7 are performed by another device or a group of devices separate from or including the memory, such as the host device 110 and/or the SoC component 505. Additionally, or alternatively, one or more process blocks of FIG. 7 may be performed by one or more components of the electronic device 100, such as the memory management component 225, and/or the training component 230, among other examples.

As shown in FIG. 7, process 700 may include receiving a clock signal having a first frequency (block 710). For example, the electronic device may receive a clock signal having a first frequency, as described above. For example, a memory device may receive the clock signal from a host device.

As further shown in FIG. 7, process 700 may include receiving, for a chip select training operation, a chip select signal having a pattern including high pulses and low pulses (block 720). For example, the electronic device may receive, for a chip select training operation, a chip select signal having a pattern including high pulses and low pulses, as described above. For example, the memory device may receive the chip select signal from the host device.

As further shown in FIG. 7, process 700 may include performing, for a sampling window, the chip select training operation using the clock signal and the chip select signal, wherein the sampling window includes a quantity of pulses of the chip select signal (block 730). For example, the electronic device may perform, for a sampling window, the chip select training operation using the clock signal and the chip select signal, wherein the sampling window includes a quantity of pulses of the chip select signal, as described above. In some aspects, the sampling window includes a quantity of pulses of the chip select signal.

As further shown in FIG. 7, process 700 may include providing, via a first DQ pin, an indication of a first result of the chip select training operation for the high pulses of the chip select signal (block 740). For example, the electronic device (e.g., the memory device) may provide, via a first DQ pin, an indication of a first result of the chip select training operation for the high pulses of the chip select signal, as described above. The host device may obtain the indication of the first result via the first DQ pin.

As further shown in FIG. 7, process 700 may include providing, via a second DQ pin, an indication of a second result of the chip select training operation for the low pulses of the chip select signal (block 750). For example, the electronic device (e.g., the memory device) may provide, via a second DQ pin, an indication of a second result of the chip select training operation for the low pulses of the chip select signal, as described above. The host device may obtain the indication of the second result via the second DQ pin.

Process 700 may include additional aspects, such as any single aspect or any combination of aspects described below and/or in connection with one or more other processes described elsewhere herein.

In a first aspect, performing the chip select training operation comprises alternating between reading the high pulses and the low pulses on rising edges of the clock signal.

In a second aspect, alone or in combination with the first aspect, alternating between reading the high pulses and the low pulses includes reading (e.g., sampling) the high pulses on even rising edges of the clock signal, and reading (e.g., sampling) the low pulses on odd rising edges of the clock signal.

In a third aspect, alone or in combination with one or more of the first and second aspects, process 700 includes determining the quantity of pulses of the chip select signal included in the sampling window.

In a fourth aspect, alone or in combination with one or more of the first through third aspects, determining the quantity of pulses includes receiving, from a host device, an indication of the quantity of pulses of the chip select signal included in the sampling window.

In a fifth aspect, alone or in combination with one or more of the first through fourth aspects, determining the quantity of pulses includes determining the quantity of pulses using chip select signals associated with one or more chip select training operations performed prior to the chip select training operation.

In a sixth aspect, alone or in combination with one or more of the first through fifth aspects, performing the chip select training operation includes receiving an indication that the chip select training operation is enabled, sampling the chip select signal for the quantity of pulses of the chip select signal, and refraining from sampling, for the chip select training operation, the chip select signal after the quantity of pulses have been sampled.

In a seventh aspect, alone or in combination with one or more of the first through sixth aspects, performing the chip select training operation includes detecting a failure associated with a high pulse of the chip select signal, wherein providing the indication of the first result comprises causing an indication of the failure to be persistently indicated via the first DQ pin for at least the sampling window.

In an eighth aspect, alone or in combination with one or more of the first through seventh aspects, performing the chip select training operation includes detecting a failure associated with a low pulse of the chip select signal, wherein providing the indication of the second result comprises causing an indication of the failure to be persistently indicated via the second DQ pin for at least the sampling window.

In a ninth aspect, alone or in combination with one or more of the first through eighth aspects, process 700 includes reducing, prior to performing the chip select training operation, the first frequency of the clock signal to a second frequency, and receiving, in association with reducing the first frequency, an indication that the chip select training operation is enabled.

In a tenth aspect, alone or in combination with one or more of the first through ninth aspects, process 700 includes reducing, after performing the chip select training operation, the first frequency of the clock signal to a second frequency, and receiving, in association with reducing the first frequency, an indication that the chip select training operation is disabled.

Although FIG. 7 shows example blocks of process 700, in some aspects, process 700 includes additional blocks, fewer blocks, different blocks, or differently arranged blocks than those depicted in FIG. 7. Additionally, or alternatively, two or more of the blocks of process 700 may be performed in parallel.

Figure 8:
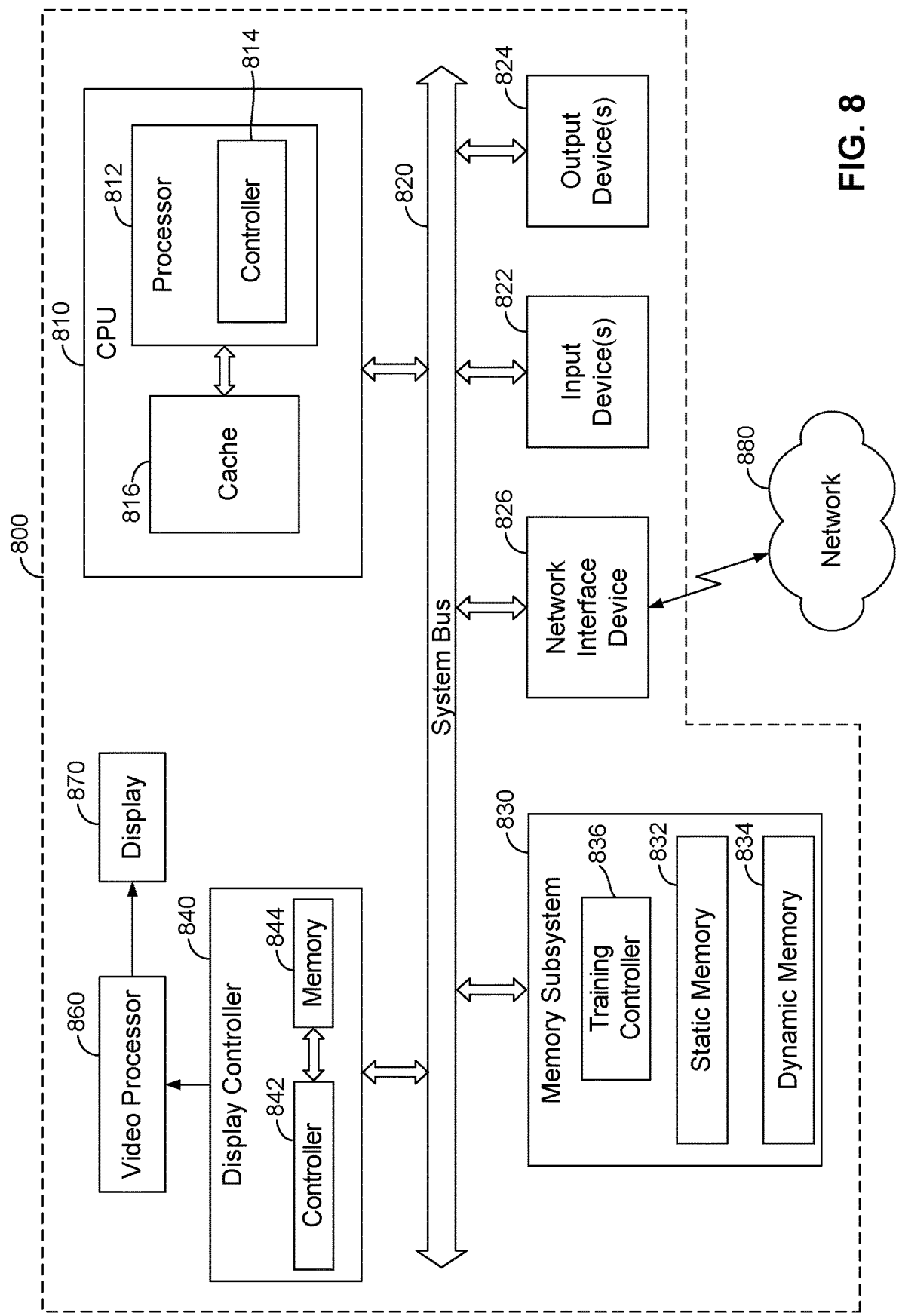
FIG. 8 is a diagram illustrating an example system that may support enhanced chip select signal training, in accordance with the present disclosure.

FIG. 8 is a diagram illustrating an example system 800 that may support enhanced chip select signal training, in accordance with the present disclosure. More particularly, as described herein, the enhanced CS training mechanisms and the corresponding methods or processes described herein can be employed in any circuit, including but not limited to a microprocessor-based circuit, system, or others suitable electronic device. For example, electronic devices that can include or otherwise employ the enhanced CS training mechanisms described herein can comprise, without limitation, mobile phones, cellular phones, computers, portable computers, desktop computers, personal digital assistants (PDAs), monitors, computer monitors, televisions, tuners, radios, satellite radios, digital music players, portable music players, digital video players, digital video disc (DVD) players, and/or portable digital video players, among other examples.

For example, in some aspects, FIG. 8 illustrates an example system 800 that can employ the enhanced CS training operation mechanisms and corresponding methods and/or processes described in further detail herein. For example, as shown in FIG. 8, the system 800 may include a CPU 810 that includes a cache 816 and a processor 812, which may include a controller 814 configured to perform one or more operations described herein in connection with FIGS. 5 and 6. Furthermore, although FIG. 8 illustrates that the controller 814 is included in the processor 812, the controller 814 may reside at any suitable location within the system 800, such as within an integrated circuit that is controlled using command bus training techniques and/or on an external integrated circuit. Additionally, or alternatively, the controller 814 may be configured to perform one or more processes described herein, such as process 700 of FIG. 7. Additionally, or alternatively, one or more components shown in FIG. 8 may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

For example, in some aspects, the controller 814 may be configured to transmit a clock signal having a first frequency; transmit, for a chip select training operation, a chip select signal having a pattern including high pulses and low pulses; obtain, via a first DQ pin, an indication of a first result of the chip select training operation for the high pulses of the chip select signal; and/or obtain, via a second DQ pin, an indication of a second result of the chip select training operation for the low pulses of the chip select signal.

In some aspects, the CPU 810 may be coupled to a system bus 820, which may intercouple various other devices or components included in the system 800. The CPU 810 may exchange address, control, and data information over the system bus 820 to communicate with the other devices or components included in the system 800. For example, as illustrated in FIG. 8, the devices or components included in the system 800 can include a memory subsystem 830 that can include static memory 832 and/or dynamic memory 834, one or more input devices 822, one or more output devices 824, a network interface device 826, and a display controller 840. The memory subsystem 830 may include a training controller 836. The training controller 836 may be configured to perform one or more command bus training operations (e.g., for commands transmitted via the system bus 820), such as the enhanced CS training operation described herein. The training controller 836 may be configured to perform one or more operations described herein in connection with FIGS. 5 and 6. Furthermore, although FIG. 8 illustrates that the training controller 836 is included in the memory subsystem 830, the training controller 836 may reside at any suitable location within the system 800, such as within an integrated circuit that is controlled using command bus training techniques and/or on an external integrated circuit. Additionally, or alternatively, the training controller 836 may be configured to perform one or more processes described herein, such as process 700 of FIG. 7.

For example, in some aspects, the training controller 836 may be configured to receive a clock signal having a first frequency; receive, for a chip select training operation, a chip select signal having a pattern including high pulses and low pulses; perform, for a sampling window, the chip select training operation using the clock signal and the chip select signal (e.g., where the sampling window includes a quantity of pulses of the chip select signal); provide, via a first DQ pin, an indication of a first result of the chip select training operation for the high pulses of the chip select signal; and/or provide, via a second DQ pin, an indication of a second result of the chip select training operation for the low pulses of the chip select signal.

In various embodiments, the input devices 822 can include any suitable input device type, such as input keys, switches, voice processors, or the like. The output devices 824 can similarly include any suitable output device type, such as audio, video, other visual indicators, or the like. The network interface device 826 can be any device configured to allow exchange of data to and from a network 880, which may comprise any suitable network type, including but not limited to a wired or wireless network, private or public network, a local area network (LAN), a wide local area network (WLAN), and the Internet. The network interface device 826 can support any type of communication protocol desired. The CPU 810 can access the memory subsystem 830 over the system bus 820.

In some aspects, the CPU 810 can also access the display controller 840 over the system bus 820 to control information sent to a display 870. The display controller 840 can include a memory controller 842 and memory 844 to store data to be sent to the display 870 in response to communications with the CPU 810. The display controller 840 sends information to the display 870 to be displayed via a video processor 860, which processes the information to be displayed into a format suitable for the display 870. The display 870 can include any suitable display type, including but not limited to a cathode ray tube (CRT), a liquid crystal display (LCD), a plasma display, or the like.

As indicated above, FIG. 8 is provided as an example. Other examples may differ from what is described with respect to FIG. 8.

The following provides an overview of some Aspects of the present disclosure:

Aspect 1: A method performed by an electronic device, comprising: receiving a clock signal having a first frequency; receiving, for a chip select training operation, a chip select signal having a pattern including high pulses and low pulses; performing, for a sampling window, the chip select training operation using the clock signal and the chip select signal, wherein the sampling window includes a quantity of pulses of the chip select signal; providing, via a first data in or out (DQ) pin, an indication of a first result of the chip select training operation for the high pulses of the chip select signal; and providing, via a second DQ pin, an indication of a second result of the chip select training operation for the low pulses of the chip select signal.

Aspect 2: The method of Aspect 1, wherein performing the chip select training operation comprises: alternating between reading the high pulses and the low pulses on rising edges of the clock signal.

Aspect 3: The method of Aspect 2, wherein alternating between reading the high pulses and the low pulses comprises: reading the high pulses on even rising edges of the clock signal; and reading the low pulses on odd rising edges of the clock signal.

Aspect 4: The method of any of Aspects 1-3, further comprising: determining the quantity of pulses of the chip select signal included in the sampling window.

Aspect 5: The method of Aspect 4, wherein determining the quantity of pulses comprises: receiving, from a host device, an indication of the quantity of pulses of the chip select signal included in the sampling window.

Aspect 6: The method of any of Aspects 4-5, wherein determining the quantity of pulses comprises: determining the quantity of pulses using chip select signals associated with one or more chip select training operations performed prior to the chip select training operation.

Aspect 7: The method of any of Aspects 1-6, wherein performing the chip select training operation comprises: receiving an indication that the chip select training operation is enabled; sampling the chip select signal for the quantity of pulses of the chip select signal; and refraining from sampling, for the chip select training operation, the chip select signal after the quantity of pulses have been sampled.

Aspect 8: The method of any of Aspects 1-7, wherein performing the chip select training operation comprises: detecting a failure associated with a high pulse of the chip select signal, wherein providing the indication of the first result comprises: causing an indication of the failure to be persistently indicated via the first DQ pin for at least the sampling window.

Aspect 9: The method of any of Aspects 1-8, wherein performing the chip select training operation comprises: detecting a failure associated with a low pulse of the chip select signal, wherein providing the indication of the second result comprises: causing an indication of the failure to be persistently indicated via the second DQ pin for at least the sampling window.

Aspect 10: The method of any of Aspects 1-9, further comprising: reducing, prior to performing the chip select training operation, the first frequency of the clock signal to a second frequency; and receiving, in association with reducing the first frequency, an indication that the chip select training operation is enabled.

Aspect 11: The method of any of Aspects 1-10, further comprising: reducing, after performing the chip select training operation, the first frequency of the clock signal to a second frequency; and receiving, in association with reducing the first frequency, an indication that the chip select training operation is disabled.

Aspect 12: A system configured to perform one or more operations recited in one or more of Aspects 1-11.

Aspect 13: An apparatus comprising means for performing one or more operations recited in one or more of Aspects 1-11.

Aspect 14: A non-transitory computer-readable medium storing a set of instructions, the set of instructions comprising one or more instructions that, when executed by a device, cause the device to perform one or more operations recited in one or more of Aspects 1-11.

Aspect 15: A computer program product comprising instructions or code for executing one or more operations recited in one or more of Aspects 1-11.

Aspect 16: A memory device comprising one or more controllers configured to perform one or more operations recited in one or more of Aspects 1-11.

Aspect 17: A device comprising one or more memories, and one or more processors coupled to the one or more memories, the one or more processors configured to perform one or more operations recited in one or more of Aspects 1-11.

Aspect 18: A device comprising one or more memories, and one or more processors coupled to the one or more memories, the one or more processors configured to cause the device to perform one or more operations recited in one or more of Aspects 1-11.

Aspect 19: A system comprising one or more controllers configured to cause the device to perform one or more operations recited in one or more of Aspects 1-11.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An electronic device, comprising:
   one or more controllers configured to cause the electronic device to:
   receive a clock signal having a first frequency;
   receive, for a chip select training operation, a chip select signal having a pattern including high pulses and low pulses;
   perform, for a sampling window, the chip select training operation using the clock signal and the chip select signal,
   wherein the sampling window includes a quantity of pulses of the chip select signal;
   provide, via a first data in or out (DQ) pin, an output indicating a first result of the chip select training operation for the high pulses of the chip select signal; and
   provide, via a second DQ pin, an output indicating a second result of the chip select training operation for the low pulses of the chip select signal, wherein the output indicating the second result of the chip select training operation for the low pulses of the chip select signal is not provided to the first DQ pin and the output indicating the first result of the chip select training operation for the high pulses of the chip select signal is not provided to the second DQ pin.

2. The electronic device of claim 1, wherein the one or more controllers, to perform the chip select training operation, are configured to cause the electronic device to:
   alternate between reading the high pulses and the low pulses on rising edges of the clock signal.

3. The electronic device of claim 2, wherein the one or more controllers, to alternate between reading the high pulses and the low pulses, are configured to cause the electronic device to:
   read the high pulses on even rising edges of the clock signal; and
   read the low pulses on odd rising edges of the clock signal.

4. The electronic device of claim 1, wherein the one or more controllers are further configured to cause the electronic device to:
   determine the quantity of pulses of the chip select signal included in the sampling window.

5. The electronic device of claim 4, wherein the one or more controllers, to determine the quantity of pulses, are configured to cause the electronic device to:
   receive, from a host device, an indication of the quantity of pulses of the chip select signal included in the sampling window.

6. The electronic device of claim 4, wherein the one or more controllers, to determine the quantity of pulses, are configured to cause the electronic device to:
   determine the quantity of pulses using chip select signals associated with one or more chip select training operations performed prior to the chip select training operation.

7. The electronic device of claim 1, wherein the one or more controllers, to perform the chip select training operation, are configured to cause the electronic device to:
   receive an indication that the chip select training operation is enabled;
   sample the chip select signal for the quantity of pulses of the chip select signal; and
   refrain from sampling, for the chip select training operation, the chip select signal after the quantity of pulses have been sampled.

8. The electronic device of claim 1, wherein the one or more controllers, to perform the chip select training operation, are configured to cause the electronic device to:
   detect a failure associated with a high pulse of the chip select signal,
   wherein the one or more controllers, to provide the indication of the first result, are configured to cause the electronic device to:
   cause an indication of the failure to be persistently indicated via the first DQ pin for at least the sampling window.

9. The electronic device of claim 1, wherein the one or more controllers, to perform the chip select training operation, are configured to cause the electronic device to:
   detect a failure associated with a low pulse of the chip select signal,
   wherein the one or more controllers, to provide the indication of the second result, are configured to cause the electronic device to:
   cause an indication of the failure to be persistently indicated via the second DQ pin for at least the sampling window.

10. The electronic device of claim 1, wherein the one or more controllers are further configured to cause the electronic device to:
    reduce, prior to performing the chip select training operation, the first frequency of the clock signal to a second frequency; and
    receive, in association with reducing the first frequency, an indication that the chip select training operation is enabled.

11. The electronic device of claim 1, wherein the one or more controllers are further configured to cause the electronic device to:
    reduce, after performing the chip select training operation, the first frequency of the clock signal to a second frequency; and
    receive, in association with reducing the first frequency, an indication that the chip select training operation is disabled.

12. A method performed by an electronic device, comprising:
    receiving a clock signal having a first frequency;
    receiving, for a chip select training operation, a chip select signal having a pattern including high pulses and low pulses;
    performing, for a sampling window, the chip select training operation using the clock signal and the chip select signal,
    wherein the sampling window includes a quantity of pulses of the chip select signal;
    providing, only via a first data in or out (DQ) pin, an output indicating a first result of the chip select training operation for the high pulses of the chip select signal; and
    providing, only via a second DQ pin, an output indicating a second result of the chip select training operation for the low pulses of the chip select signal, wherein the output indicating the second result of the chip select training operation for the low pulses of the chip select signal is not provided to the first DQ pin and the output indicating the first result of the chip select training operation for the high pulses of the chip select signal is not provided to the second DQ pin.

13. The method of claim 12, wherein performing the chip select training operation comprises:
   alternating between reading the high pulses and the low pulses on rising edges of the clock signal.

14. The method of claim 13, wherein alternating between reading the high pulses and the low pulses comprises:
   reading the high pulses on even rising edges of the clock signal; and
   reading the low pulses on odd rising edges of the clock signal.

15. The method of claim 12, further comprising:
   determining the quantity of pulses of the chip select signal included in the sampling window.

16. The method of claim 15, wherein determining the quantity of pulses comprises:
   receiving, from a host device, an indication of the quantity of pulses of the chip select signal included in the sampling window.

17. The method of claim 15, wherein determining the quantity of pulses comprises:
   determining the quantity of pulses using chip select signals associated with one or more chip select training operations performed prior to the chip select training operation.

18. The method of claim 12, wherein performing the chip select training operation comprises:
   receiving an indication that the chip select training operation is enabled;
   sampling the chip select signal for the quantity of pulses of the chip select signal; and
   refraining from sampling, for the chip select training operation, the chip select signal after the quantity of pulses have been sampled.

19. The method of claim 12, wherein performing the chip select training operation comprises:
   detecting a failure associated with a high pulse of the chip select signal,
      wherein providing the indication of the first result comprises:
         causing an indication of the failure to be persistently indicated via the first DQ pin for at least the sampling window.

20. The method of claim 12, wherein performing the chip select training operation comprises:
   detecting a failure associated with a low pulse of the chip select signal,
      wherein providing the indication of the second result comprises:
         causing an indication of the failure to be persistently indicated via the second DQ pin for at least the sampling window.

21. The method of claim 12, further comprising:
   reducing, prior to performing the chip select training operation, the first frequency of the clock signal to a second frequency; and
   receiving, in association with reducing the first frequency, an indication that the chip select training operation is enabled.

22. The method of claim 12, further comprising:
   reducing, after performing the chip select training operation, the first frequency of the clock signal to a second frequency; and
   receiving, in association with reducing the first frequency, an indication that the chip select training operation is disabled.

23. A system comprising:
   one or more controllers configured to:
      receive a clock signal having a first frequency;
      receive, for a chip select training operation, a chip select signal having a pattern including high pulses and low pulses;
      perform, for a sampling window, the chip select training operation using the clock signal and the chip select signal,
         wherein the sampling window includes a quantity of pulses of the chip select signal;
      provide, via a first data in or out (DQ) pin, an output indicating a first result of the chip select training operation for the high pulses of the chip select signal; and
      provide, via a second DQ pin, an output indicating a second result of the chip select training operation for the low pulses of the chip select signal, wherein the output indicating the second result of the chip select training operation for the low pulses of the chip select signal is not provided to the first DQ pin and the output indicating the first result of the chip select training operation for the high pulses of the chip select signal is not provided to the second DQ pin.

24. The system of claim 23, wherein the one or more controllers, to perform the chip select training operation, are configured to:
   alternate between reading the high pulses and the low pulses on rising edges of the clock signal.

25. The system of claim 23, wherein the one or more controllers are further configured to:
   receive, from a host device, an indication of the quantity of pulses of the chip select signal included in the sampling window.

26. The system of claim 23, wherein the one or more controllers, to perform the chip select training operation, are configured to:
   receive an indication that the chip select training operation is enabled;
   sample the chip select signal for the quantity of pulses of the chip select signal; and
   refrain from sampling, for the chip select training operation, the chip select signal after the quantity of pulses have been sampled.

27. The system of claim 23, wherein the one or more controllers, to perform the chip select training operation, are configured to:
   detect a failure associated with a high pulse of the chip select signal,
      wherein the one or more controllers, to provide the indication of the first result, are configured to:
         cause an indication of the failure to be persistently indicated via the first DQ pin for at least the sampling window.

28. An apparatus, comprising:
   means for receiving a clock signal having a first frequency;
   means for receiving, for a chip select training operation, a chip select signal having a pattern including high pulses and low pulses;
   means for performing, for a sampling window, the chip select training operation using the clock signal and the chip select signal,
      wherein the sampling window includes a quantity of pulses of the chip select signal;
   means for providing, via a first data in or out (DQ) pin, an output indicating a first result of the chip select training operation for the high pulses of the chip select signal; and means for providing, via a second DQ pin, an output indicating a second result of the chip select training operation for the low pulses of the chip select signal, wherein the output indicating the second result of the chip select training operation for the low pulses of the chip select signal is not provided to the first DQ pin and the output indicating the first result of the chip select training operation for the high pulses of the chip select signal is not provided to the second DQ pin.

29. The apparatus of claim 28, further comprising:
means for determining the quantity of pulses of the chip select signal included in the sampling window.

30. The apparatus of claim 28, further comprising:
means for reducing, prior to performing the chip select training operation, the first frequency of the clock signal to a second frequency; and
means for receiving, in association with reducing the first frequency, an indication that the chip select training operation is enabled.

* * * * *